US012797939B2

(12) United States Patent
Saito

(10) Patent No.: US 12,797,939 B2
(45) Date of Patent: Nov. 17, 2026

(54) SHAFT MEMBER AND METHOD FOR MANUFACTURING MALE SHAFT

(71) Applicant: NSK LTD., Tokyo (JP)

(72) Inventor: Takeshi Saito, Maebashi (JP)

(73) Assignee: NSK LTD., Tokyo (JP)

( * ) Notice: Subject to any disclaimer, the term of this patent is extended or adjusted under 35 U.S.C. 154(b) by 1338 days.

(21) Appl. No.: 17/610,910

(22) PCT Filed: May 15, 2020

(86) PCT No.: PCT/JP2020/019538
§ 371 (c)(1),
(2) Date: Nov. 12, 2021

(87) PCT Pub. No.: WO2020/230898
PCT Pub. Date: Nov. 19, 2020

(65) Prior Publication Data

US 2022/0212244 A1 Jul. 7, 2022

(30) Foreign Application Priority Data

May 15, 2019 (JP) ................................ 2019-092097

(51) Int. Cl.
*B21H 3/04* (2006.01)
*B21H 3/06* (2006.01)
(Continued)

(52) U.S. Cl.
CPC ................ *B21H 3/04* (2013.01); *B21H 3/06* (2013.01); *F16C 3/02* (2013.01); *F16H 25/24* (2013.01); *F16H 2025/2481* (2013.01)

(58) Field of Classification Search
CPC .. B21H 3/04; B21H 3/06; B21H 3/046; F16C 3/02; F16C 19/06; F16C 35/12;
(Continued)

(56) References Cited

U.S. PATENT DOCUMENTS 6,149,363 A 11/2000 March
2008/0080996 A1* 4/2008 Kataoka ................ F04C 18/16 418/152
(Continued)

FOREIGN PATENT DOCUMENTS

CN 100374227 C 3/2008
JP 7-164087 A 6/1995
(Continued)

OTHER PUBLICATIONS

Communication dated May 19, 2022 issued by the European Patent Office in counterpart European Application No. 20805912.1.
(Continued)

*Primary Examiner* — Christopher J. Besler
(74) *Attorney, Agent, or Firm* — Sughrue Mion, PLLC

(57) ABSTRACT

A shaft member includes: an outer peripheral surface; at least one axial side surface facing an axial direction; a chamfered portion formed at a connection portion between an axial end edge of the outer peripheral surface and an outer peripheral edge of the axial side surface; and a processing target portion formed on at least a part of the outer peripheral surface. The chamfered portion includes at least one supported surface portion disposed at an axially intermediate portion of the chamfered portion and inclined radially outward as approaching the processing target portion in the axial direction. The axial end edge of the outer peripheral surface and the outer peripheral edge of the axial side surface are located radially inward than a tangent line at an axially intermediate portion of the supported surface portion, in a cross section in the axial direction.

18 Claims, 14 Drawing Sheets

(51) Int. Cl.
*F16C 3/02* (2006.01)
*F16H 25/24* (2006.01)

(58) Field of Classification Search
CPC ................ F16C 29/045; F16C 2240/44; F16C 2322/39; F16C 2326/01; F16H 25/24; F16H 2025/2481; B21K 1/06
See application file for complete search history.

(56) References Cited

U.S. PATENT DOCUMENTS

| | | | |
|---|---|---|---|
| 2014/0157918 | A1 | 6/2014 | Ikeda et al. |
| 2016/0076575 | A1 | 3/2016 | Kamal et al. |

FOREIGN PATENT DOCUMENTS

| | | | |
|---|---|---|---|
| JP | 7-171648 | A | 7/1995 |
| JP | 8-318340 | A | 3/1996 |
| JP | 2004-130504 | A | 4/2004 |
| JP | 4367833 | B2 | 11/2009 |
| JP | 2014-43905 | A | 3/2014 |

OTHER PUBLICATIONS

International Search Report (PCT/ISA/210) issued Aug. 4, 2020 by the International Searching Authority in counterpart International Patent Application No. PCT/JP2020/019538.
Written Opinion (PCT/ISA/237) issued Aug. 4, 2020 by the International Searching Authority in counterpart International Patent Application No. PCT/JP2020/019538.

* cited by examiner

SHAFT MEMBER AND METHOD FOR MANUFACTURING MALE SHAFT

TECHNICAL FIELD

The present invention relates to a shaft member and a method for manufacturing a male shaft. For example, the shaft member has, on an outer peripheral surface thereof, a processing target portion for forming a male-side engagement portion such as a male screw portion. For example, in the method for manufacturing a male shaft, a male shaft is manufactured by rolling-processing a shaft member.

BACKGROUND ART

In a machine tool or a position adjusting device of a steering wheel, a rotational motion of a drive source such as an electric motor is converted into a linear motion by a feed screw mechanism. As the feed screw mechanism, there are a slide screw type and a ball screw type.

A feed screw mechanism of a slide screw type includes a screw shaft and a nut.

An outer peripheral surface of the screw shaft has a male screw portion in which a male screw groove having a triangular or trapezoidal cross section is spirally formed. An inner peripheral surface of the nut has a female screw portion in which a female screw groove having a triangular or trapezoidal cross section is spirally formed. The feed screw mechanism is configured by screwing the male screw groove of the screw shaft and the female screw groove of the nut.

A feed screw mechanism of a ball screw type includes a screw shaft, a nut, and a plurality of balls.

An outer peripheral surface of the screw shaft has a male screw portion in which a male screw groove having an arc-shaped cross section is spirally formed. An inner peripheral surface of the nut has a female screw portion in which a female screw groove having an arc-shaped cross section is spirally formed. The plurality of balls are rollably disposed between the male screw groove of the screw shaft and the female screw groove of the nut.

Regardless of whether the feed screw mechanism is a feed screw mechanism of a slide screw type or a feed screw mechanism of a ball screw type, the male screw portion of the screw shaft configuring the feed screw mechanism can be formed by, for example, rolling processing.

JP-A-8-318340 (Patent Literature 1) describes a rolling machine for forming a male screw portion on an outer peripheral surface of a columnar metal material (workpiece material) by rolling processing. In the rolling machine, in a state where both axial end portions of the material are rotatably supported by jigs (center) each having a conical tip end portion, the material is sandwiched between a pair of round dies, the pair of round dies are pressed while being rotated, and thus the male screw portion is rolled on the outer peripheral surface of the material.

CITATION LIST

Patent Literature

Patent Literature 1: JP-A-8-318340

SUMMARY OF INVENTION

Technical Problem

When the male screw portion is rolled on the outer peripheral surface of the material by using the rolling machine described in JP-A-8-318340, recessed holes each having a conical concave surface shape are formed in both axial end surfaces of the material. Then, it is necessary to position the material in a radial direction thereof by abutting conical tip end portions provided on the jig against inner peripheral surfaces of the recessed holes.

When the feed screw mechanism is incorporated into a structure in which another member is pressed by an axial end surface of the screw shaft, or when information for identifying a product is engraved on the axial end surface of the screw shaft, the axial end surface of the screw shaft is preferably a flat surface or a curved surface in which the recessed hole is not present. Therefore, a method of rolling a male screw portion on an outer peripheral surface of a columnar material in a state where tip end portions of a jig are abutted against inner peripheral surfaces of recessed holes formed in both axial end surfaces of the material to position the material in a radial direction thereof, and then cutting and removing an axial end portion of the material is considered.

However, when the axial end portion of the material is cut and removed, if the axial end portion of the material is cut in a state where the material is supported by gripping the male screw portion, the male screw portion may be deformed and the accuracy of the male screw portion may be reduced. That is, when the male screw portion of the screw shaft is gripped and a screw thread of the male screw portion is deformed so as to be recessed (a dent is formed), an inner surface of the screw groove is deformed so as to bulge (rise) accordingly. For example, when a feed screw mechanism of a ball screw type is configured by using a screw shaft in which such deformation occurs, the balls may ride on the bulging portion of the screw groove and the movement of the balls cannot be smoothly performed.

In order to prevent such deformation of the male screw portion, it is required to roll the male screw portion on the outer peripheral surface of the material in a state where the material is positioned in the radial direction thereof without forming recessed holes in the axial end surfaces of the material. Therefore, it is conceivable to support both axial end portions of the material by a jig having a recessed portion having a conical concave surface shape.

Specifically, as shown in FIG. 14, a pair of jigs 101, 101 each having a recessed portion 100 having a conical concave surface shape are supported on a frame of a processing apparatus (not shown). An inner peripheral surface of the recessed portion 100 of the jig 101 is abutted against a chamfered portion 103 of a columnar shaft member 102 that is formed at a connection portion between an axial end edge of an outer peripheral surface and an outer peripheral edge of an axial end surface of the shaft member 102, and thus the shaft member 102 is positioned in a radial direction thereof. In this state, when the outer peripheral surface of the shaft member 102 is pressed (sandwiched) from both radial sides by a pair of round dies rotating in the same direction, the shaft member 102 rotates while the chamfered portions 103 are in sliding contact with the inner peripheral surfaces of the recessed portions 100 of the jigs 101. As a result, a male screw portion is rolled on the outer peripheral surface of the shaft member 102. FIG. 14 shows a state after the male screw portion is formed on a processing target portion on the outer peripheral surface of the shaft member 102.

However, also in the above-described method, the following problem may occur. That is, in the method shown in FIG. 14, the chamfered portion 103 is a C-chamfered portion having a linear cross-sectional shape. Therefore, when the shaft member 102 is rotated in a state where the inner peripheral surface of the recessed portion 100 of the jig 101 is strongly pressed against the chamfered portion 103 in order to support both axial end portions of the shaft member 102, burr or protrusion excess portions 104*a*, 104*b* may be formed to protrude in the radial direction from the axial end edge of the outer peripheral surface of the shaft member 102, or may be formed to protrude in the axial direction from the outer peripheral edge of the axial end surface of the shaft member 102, as exaggeratedly shown in FIG. 15.

As a result, after the male screw portion is formed, an operation (processing) for removing the excess portions 104*a*, 104*b* is required, and the manufacturing cost is increased. In the example of FIG. 15, an amount of the excess portion 104*a* protruding in the radial direction from the axial end edge of the outer peripheral surface of the shaft member 102 is larger than an amount of the excess portion 104*b* protruding in the axial direction from the outer peripheral edge of the axial end surface of the shaft member 102. The amounts of the excess portions 104*a*, 104*b* vary depending on an outer diameter dimension of the shaft member 102, an inclination angle of a generatrix of the chamfered portion 103 with respect to a central axis of the shaft member 102, a surface area of the chamfered portion 103, and the like, and in general, the amount of the excess portion 104*a* protruding in the radial direction is substantially the same as the amount of the excess portion 104*b* protruding in the axial direction. However, when the outer diameter dimension of the shaft member 102 is relatively small, the amount of the excess portion 104*b* protruding in the axial direction may be larger than the amount of the excess portion 104*a* protruding in the radial direction.

In view of the above-described circumstances, an object of the present invention is to provide a structure of a shaft member in which the shape accuracy of a male-side engagement portion is good and the manufacturing cost can be reduced.

Solution to Problem

The present invention can be configured, for example, as follows.

(1) A shaft member including:
- an outer peripheral surface;
- at least one axial side surface facing an axial direction;
- a chamfered portion formed at a connection portion between an axial end edge of the outer peripheral surface and an outer peripheral edge of the axial side surface; and
- a processing target portion formed on at least a part of the outer peripheral surface, wherein
- the chamfered portion includes at least one supported surface portion disposed at an axially intermediate portion of the chamfered portion and inclined radially outward as approaching the processing target portion in the axial direction, and
- the axial end edge of the outer peripheral surface and the outer peripheral edge of the axial side surface are located radially inward than a tangent line at an axially intermediate portion of the supported surface portion, in a cross section in the axial direction.

(2) The shaft member according to (1), wherein the supported surface portion is a conical surface having a linear generatrix.

(3) The shaft member according to (1), wherein the supported surface portion is a convex curved surface having an arc-shaped generatrix.

(4) The shaft member according to any one of (1) to (3), wherein the chamfered portion further includes:
- a first connection inclined surface portion that connects an axial end edge on a side axially close to the processing target portion in both axial end edges of the supported surface portion and the axial end edge of the outer peripheral surface, and that is inclined radially outward as approaching the processing target portion in the axial direction, or
- a first step portion that has a circular ring-shaped flat surface portion bent radially inward from at least the axial end edge of the outer peripheral surface.

(5) The shaft member according to any one of (1) to (4), wherein the chamfered portion further includes:
- a second connection inclined surface portion that connects an axial end edge on a side axially far from the processing target portion in the both axial end edges of the supported surface portion and the outer peripheral edge of the axial side surface, and that is inclined radially outward as approaching the processing target portion in the axial direction, or
- a second step portion that has a cylindrical surface portion bent from at least the outer peripheral edge of the axial side surface in a direction approaching the processing target portion in the axial direction.

(6) The shaft member according to any one of (1) to (5), wherein the chamfered portion includes a pair of the supported surface portions, and the pair of supported surface portions are connected to each other by a third step portion including a circular ring-shaped flat surface portion and a cylindrical surface portion.

(7) The shaft member according to any one of (1) to (6), wherein the axial side surface is an axial end surface.

(8) The shaft member according to any one of (1) to (7), wherein a stepped cylindrical portion, in which a small-diameter cylindrical portion and a large-diameter cylindrical portion are connected to each other by a step surface facing the axial direction, is provided at a portion on the outer peripheral surface that is deviated from the processing target portion in the axial direction, and
- the axial side surface is the step surface.

(9) The shaft member according to (8), wherein a recessed groove recessed radially inward is provided in an end portion of the small-diameter cylindrical portion that is on a side close to the large-diameter cylindrical portion in the axial direction.

(10) The shaft member according to any one of (1) to (9), wherein the shaft member is used as a screw shaft for a brake actuator.

(11) A method for manufacturing a male shaft including an outer peripheral surface, and a male-side engagement portion formed on at least a part of the outer peripheral surface, the method including:
- a step of performing processing for forming the male-side engagement portion on the outer peripheral surface in a state where the shaft member according to any one of (1) to (10) is positioned in a radial direction by pressing at least an axially intermediate portion of the supported surface portion of the shaft member against a tapered surface provided on a jig.

(12) A method for manufacturing a male shaft including an outer peripheral surface, and a male-side engagement portion formed on at least a part of the outer peripheral surface, the method including:

a step of performing processing for forming the male-side engagement portion on the outer peripheral surface in a state where at least an axially intermediate portion of the supported surface portion of the shaft member according to (10) is pressed against a tapered surface provided on a jig and grease is held in the recessed groove.

(13) The method for manufacturing a male shaft according to (11) or (12), wherein the processing for forming the male-side engagement portion is rolling processing.

(14) The method for manufacturing a male shaft according to any one of (11) to (13), wherein the male-side engagement portion is a male screw portion in which a male screw groove is spirally formed.

(15) The method for manufacturing a male shaft according to any one of (11) to (14) further including:

a heat treatment step of performing a heat treatment on the male shaft, wherein the male shaft is not further processed after the heat treatment step.

The axial side surface facing the axial direction refers to an axial end surface or a step surface formed on an outer peripheral surface and connecting the small-diameter cylindrical portion and the large-diameter cylindrical portion.

Advantageous Effects of Invention

According to the present invention, deformation of the male-side engagement portion can be prevented, and the manufacturing cost can be reduced.

DESCRIPTION OF EMBODIMENTS

First Embodiment

FIGS. 1A to 5 show a first embodiment of the present invention. A male shaft 11 serving as a target of the present embodiment is a ball screw shaft configuring a feed screw mechanism of a ball screw type. The male shaft 11 includes an outer peripheral surface 2, first and second end surfaces 3*a* and 3*b* on both axial sides, and a male screw portion 4 that is a male-side engagement portion.

Both of the first and second end surfaces 3*a*, 3*b* on both axial sides do not have recessed holes that is opened in the first and second end surfaces 3*a*, 3*b*.

In the present embodiment, the first end surface 3*a* on one axial side (a left side in FIGS. 1A and 1B) is configured by a single convex curved surface having a partially spherical shape.

The second end surface 3*b* on the other axial side (a right side in FIGS. 1A and 1B) is configured by a flat surface orthogonal to a central axis of the male shaft 11.

In the male screw portion 4, a male screw groove 8 having an arc-shaped cross section is formed spirally in an axially intermediate portion of the outer peripheral surface 2 of the male shaft 11.

The feed screw mechanism of a ball screw type is configured by assembling the male shaft 11, a ball nut (not shown) having a female screw portion in which a female screw groove having an arc-shaped cross section is formed spirally on an inner peripheral surface of the ball nut, and a plurality of balls (not shown). That is, the ball nut is disposed around the male screw portion 4 of the male shaft 11, and the balls are rollably disposed between the male screw groove 8 and the female screw groove of the ball nut, thereby configuring the feed screw mechanism.

Figure 1A:
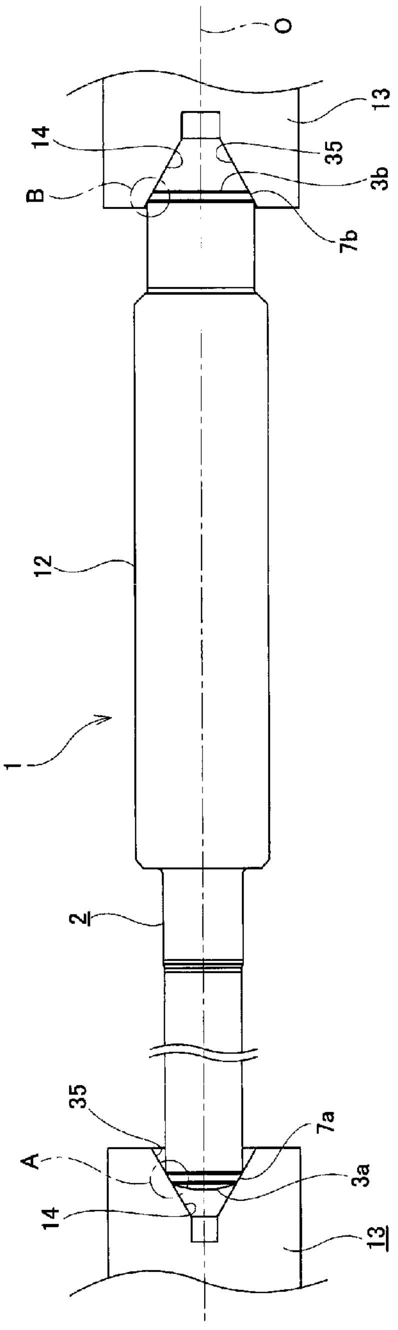
FIG. 1A is a side view showing a shaft member according to a first embodiment of the present invention.
Figure 1B:
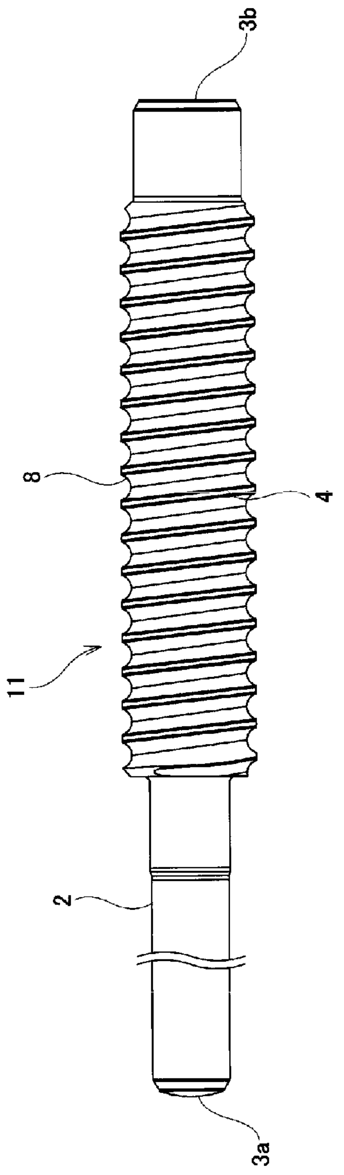
FIG. 1B is a male shaft manufactured by rolling a processing target portion of the shaft member.
Figure 2:
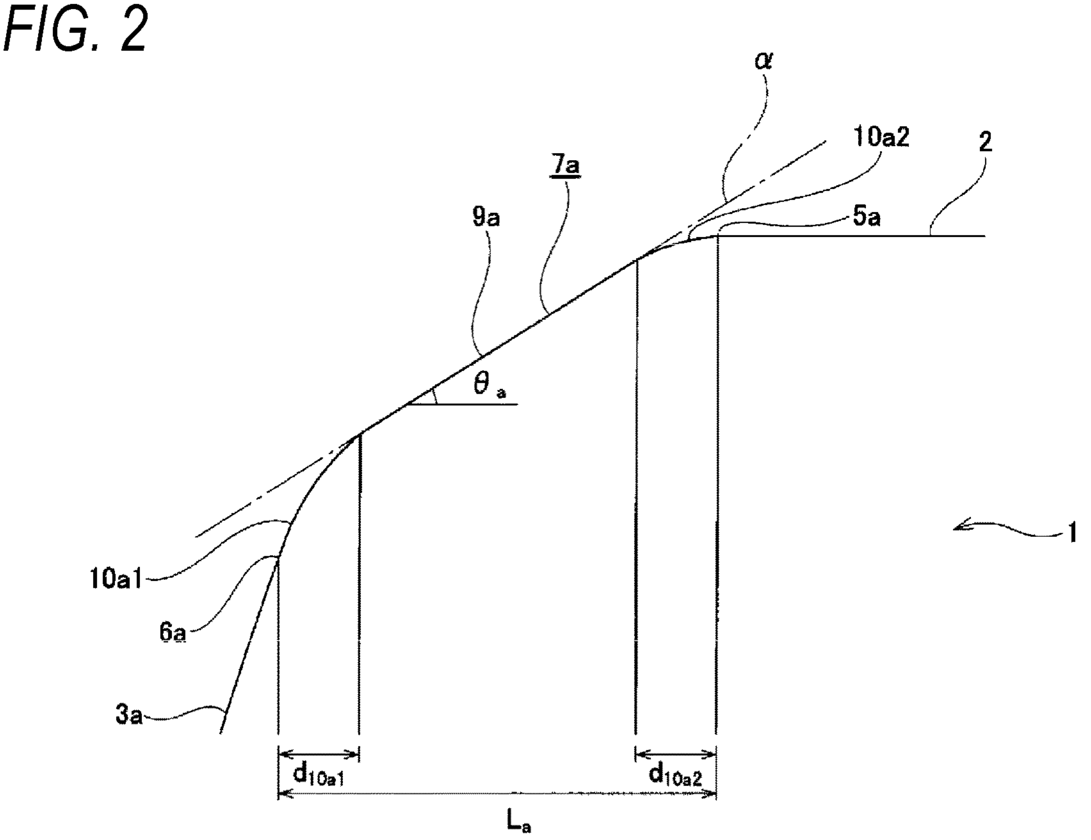
FIG. 2 is an enlarged view of a portion A in FIG. 1(A), and showing the shaft member that is taken out.
Figure 3:
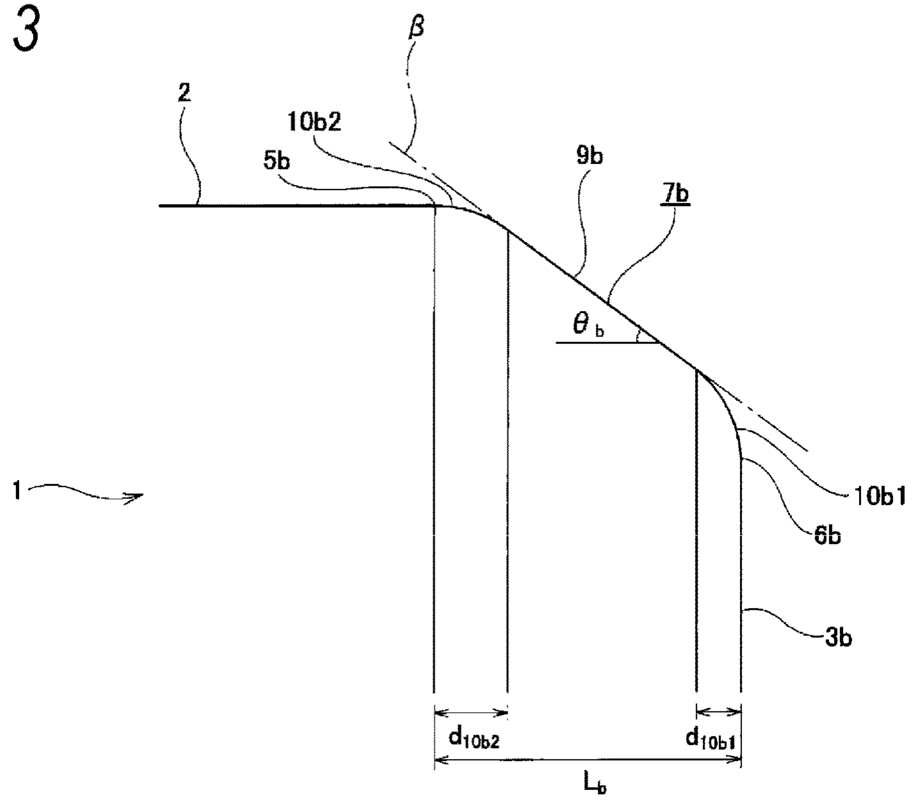
FIG. 3 is an enlarged view of a portion B in FIG. 1(A), and showing the shaft member that is taken out.

The male shaft 11 is obtained by rolling a processing target portion 12 of the shaft member 1 as shown in FIG. 1A. The shaft member 1 includes the outer peripheral surface 2, first and second end surfaces 3*a* and 3*b* on both axial sides, the processing target portion 12, and first and second chamfered portions 7*a*, 7*b*. The first and second chamfered portions 7*a*, 7*b* are respectively formed at connection portions between first and second end edges 5*a* and 5*b* on both axial sides of the outer peripheral surface 2 and first and second outer peripheral edges 6*a*, 6*b* of the first and second end surfaces 3*a*, 3*b* on both axial sides.

The processing target portion 12 is disposed at the axially intermediate portion of the outer peripheral surface 2. An outer diameter dimension of the processing target portion 12 is larger than outer diameter dimensions of portions adjacent thereto on both axial sides.

Each of the first and second chamfered portions 7*a*, 7*b* is a composite surface formed by combining three or more surfaces. In the composite surface, axially adjacent surfaces are different in an inclination angle or a curvature radius of a generatrix of the surface with respect to a central axis O of the shaft member 1.

The first and second chamfered portions 7*a*, 7*b* respectively include first and second supported surface portions 9*a*, 9*b* which are respectively disposed at axially intermediate portions of the first and second chamfered portions 7*a*, 7*b* and are each inclined radially toward as approaching the male screw portion 4 in the axial direction. In the present embodiment, each of the first and second supported surface portions 9*a*, 9*b* is a conical surface having a linear generatrix. In addition, in a cross section in the axial direction (a cross section including the central axis O of the shaft member 1), the first and second end edges 5*a*, 5*b* of the outer peripheral surface 2 and the first and second outer peripheral edges 6*a*, 6*b* of the first and second end surfaces 3*a*, 3*b* on both axial sides are located radially inward than generatrices (including an extension line of the generatrix) α, β of the first and second supported surface portions 9*a*, 9*b*. That is, in the cross section in the axial direction (the cross section including the central axis O of the shaft member 1), the first and second end edges 5*a*, 5*b* of the outer peripheral surface 2 and the first and second outer peripheral edges 6*a*, 6*b* of the first and second end surfaces 3*a*, 3*b* on both axial sides are located radially inward than tangent lines at axially intermediate portions of the first and second supported surface portions 9*a*, 9*b*.

For this reason, in the present embodiment, in the first and second chamfered portions 7*a*, 7*b*, the first chamfered portion 7*a* on the one axial side which is formed at the connection portion between the first end edge 5*a* on the one axial side of the outer peripheral surface 2 and the first outer peripheral edge 6*a* of the first end surface 3*a* on the one axial side, includes the first supported surface portion 9*a* and a pair of connection inclined surface portions 10*a*1, 10*a*2.

The first supported surface portion 9*a* is a conical surface that is disposed at an axially intermediate portion of the first chamfered portion 7*a* on the one axial side and has a linear generatrix inclined radially outward as approaching the other axial side. An inclination angle θa of the generatrix of the first supported surface portion 9*a* with respect to the central axis O of the shaft member 1 is preferably 20° or more and 60° or less, and is about 30° in the illustrated example.

In the pair of connection inclined surface portions 10*a*1, 10*a*2, the connection inclined surface portion 10*a*1 on the one axial side, that connects the first outer peripheral edge 6*a* of the first end surface 3*a* on the one axial side and an end edge on the one axial side of the first supported surface portion 9*a*, is a convex curved surface having an arc-shaped generatrix inclined radially outward as approaching the other axial side.

In the pair of connection inclined surface portions 10*a*1, 10*a*2, the connection inclined surface portion 10*a*2 on the other axial side, that connects an end edge on the other axial side of the first supported surface portion 9*a* and the first end edge 5*a* on the one axial side of the outer peripheral surface 2, is a convex curved surface having an arc-shaped generatrix inclined radially outward as approaching the other axial side.

Each of axial dimensions d10*a*1, d10*a*2 of the connection inclined surface portions 10*a*1, 10*a*2 is preferably 10% or more and 35% or less of an axial dimension La of the entire first chamfered portion 7*a*. Each of curvature radiuses of the generatrices of the connection inclined surface portions 10*a*1, 10*a*2 is preferably 1% or more and 30% or less of an outer diameter dimension of a portion of the shaft member 1 adjacent to the other axial side of the connection inclined surface portion 10*a*2 (an outer diameter dimension of the first end edge 5*a* on the one axial side of the outer peripheral surface 2).

In the first and second chamfered portions 7*a*, 7*b*, the second chamfered portion 7*b* on the other axial side, that connects the second end edge 5*b* on the other axial side of the outer peripheral surface 2 and the second outer peripheral edge 6*b* of the second end surface 3*b* on the other axial side, includes the second supported surface portion 9*b* and a pair of connection inclined surface portions 10*b*1, 10*b*2.

The second supported surface portion 9*b* is a conical surface that is disposed at an axially intermediate portion of the second chamfered portion 7*b* on the other axial side and has a linear generatrix inclined radially outward as approaching the one axial side. An inclination angle θb of the generatrix of the second supported surface portion 9*b* with respect to the central axis O of the shaft member 1 is preferably 20° or more and 60° or less, and is about 30° in the illustrated example.

In the pair of connection inclined surface portions 10*a*1, 10*a*2, the connection inclined surface portion 10*b*1 on the other axial side, that connects the second outer peripheral edge 6*b* of the second end surface 3*b* on the other axial side and an end edge on the other axial side of the second supported surface portion 9*b*, is a convex curved surface having an arc-shaped generatrix inclined radially outward as approaching the one axial side. In the pair of connection inclined surface portions 10*b*1, 10*b*2, the connection inclined surface portion 10*b*2 on the one axial side, that connects an end edge on the one axial side of the second supported surface portion 9*b* and the second end edge 5*b* on the other axial side of the outer peripheral surface 2, is a convex curved surface having an arc-shaped generatrix inclined radially outward as approaching the one axial side. Each of axial dimensions d10*b*1, d10*b*2 of the connection inclined surface portions 10*b*1, 10*b*2 is preferably 10% or more and 35% or less of an axial dimension Lb of the entire second chamfered portion 7*b*. Each of curvature radiuses of the generatrices of the connection inclined surface portions 10*a*1, 10*a*2 is preferably 1% or more and 30% or less of an outer diameter dimension of a portion of the shaft member 1 adjacent to the one axial side of the connection inclined surface portion 10*b*2 (an outer diameter dimension of the second end edge 5*a* on the other axial side of the outer peripheral surface 2).

In this way, the pair of connection inclined surface portions 10*a*1, 10*a*2 of the first end surface 3*a* and the pair of connection inclined surface portions 10*b*1, 10*b*2 of the second end surface 3*b* are each set into a gentle R shape, and thus elongation is absorbed by the connection inclined surface portions 10*a*1, 10*a*2, 10*b*1, 10*b*2 at the time of the rolling processing, and the male shaft 11 can be prevented from extending in the axial direction. The first end surface 3*a* and the second end surface 3*b* may have any shape, and can have a shape capable of absorbing the axial elongation of the male shaft 11 at the time of the rolling processing.

Figure 4A:
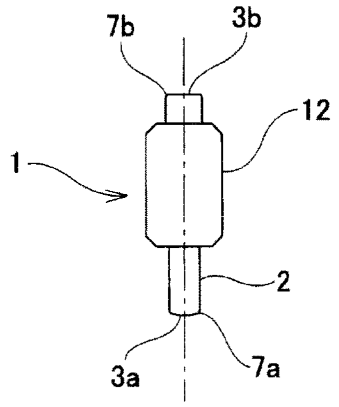
FIG. 4A to FIG. 4E are side views showing a method for manufacturing the shaft member according to the first embodiment of the present invention.

As to be described later, before the rolling processing (FIG. 4B to FIG. 4D) is performed, cutting processing such as cutting or grinding is performed on the columnar material, and the shaft member 1 as shown in FIG. 4A is obtained. When the columnar material is processed into the shaft member 1, the first and second chamfered portions 7*a*, 7*b* are formed. Therefore, since the connection inclined surface portions 10*a*1, 10*a*2, 10*b*1, 10*b*2 are formed on the first end surface 3*a* and the second end surface 3*b* in advance before the rolling processing, elongation can be absorbed by the connection inclined surface portions 10$a$1, 10$a$2, 10$b$1, 10$b$2 at the time of the rolling processing performed thereafter.

Next, a method for manufacturing the male shaft 11 from the shaft member 1 of the present embodiment will be described with reference to FIGS. 4A to 5.

Figure 4B:
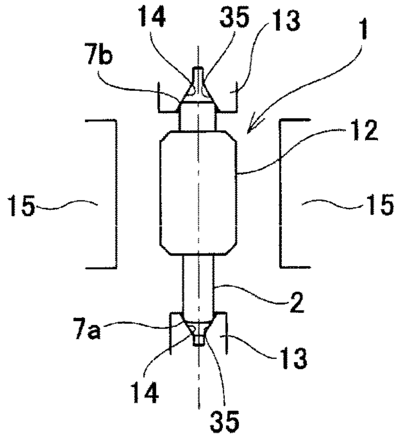
Figure 4C:
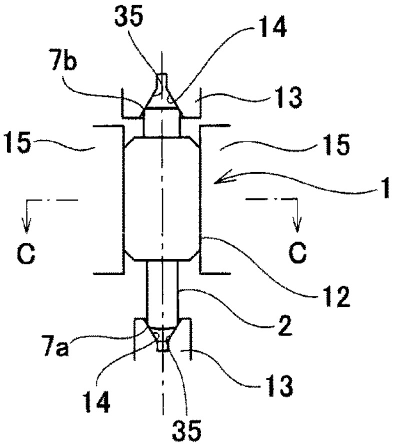
Figure 4D:
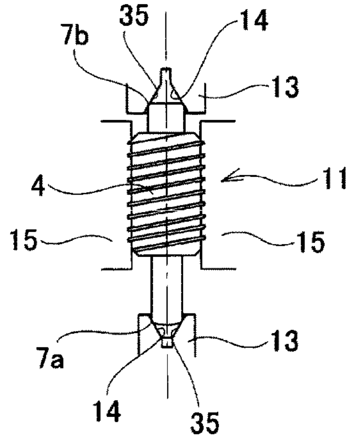

First, the columnar material is obtained by cutting a bar-shaped material, which is made of an iron-based metal such as carbon steel or chromium-molybdenum steel and has a circular cross-sectional shape, into a predetermined length. Next, cutting processing such as cutting and grinding is performed on the material, and the shaft member 1 as shown in FIG. 4A is obtained. When the columnar material is processed into the shaft member 1, the first and second chamfered portions 7$a$, 7$b$ are formed at the connection portions between the outer peripheral surface 2 and the first and second end surfaces 3$a$, 3$b$ on both axial sides. Thereafter, as shown in FIGS. 4B to 4D, during the rolling processing for forming the male screw portion 4, the outer peripheral surface 2 and the first and second end surfaces 3$a$, 3$b$ are finished in a state where the shaft member 1 is positioned in the radial direction by pressing tapered surfaces provided on the inner peripheral surfaces of the recessed portions 14 of the jigs 13 against the first and second supported surface portions 9$a$, 9$b$ of the first and second chamfered portions 7$a$, 7$b$.

Next, the male shaft 11 is to be obtained by performing the rolling processing on the processing target portion 12 of the shaft member 1 and forming the male screw portion 4. For this purpose, first, as shown in FIG. 4B, both axial end portions of the shaft member 1 are supported by the pair of jigs 13 each having the recessed portion 14. A generatrix of a tapered surface 35 provided on the inner peripheral surface of each recessed portion 14 of the jig 13 is linearly inclined in a direction in which an inner diameter dimension of the tapered surface 35 increases as approaching an opening of the recessed portion 14. An inclination angle φ of a generatrix of the tapered surface 35 with respect to the central axis O is the same as the inclination angles θa, θb of the first and second supported surface portions 9$a$, 9$b$ of the first and second chamfered portions 7$a$, 7$b$ of the shaft member 1. Therefore, in a state where the tapered surfaces 35 are abutted against (pressed against) the first and second supported surface portions 9$a$, 9$b$, the first and second end edges 5$a$, 5$b$ on both axial sides of the outer peripheral surface 2 of the shaft member 1 and the first and second outer peripheral edges 6$a$, 6$b$ of the first and second end surfaces 3$a$, 3$b$ are not in contact with the tapered surfaces 35.

The jig 13 may be made of, for example, an iron-based metal such as high-speed steel. Alternatively, (i) a portion including at least the tapered surface 35 of the jig 13 is made of cemented carbide or polycrystalline diamond, and/or (ii) mirror finishing is performed on the tapered surface 35, thus frictional resistance with respect to the first and second supported surface portions 9$a$, 9$b$ can be reduced, and wear of the tapered surface 35 can be prevented. In addition, as a method of preventing the wear of the tapered surface 35 while reducing the cost, a coating layer can also be formed on the tapered surface 35 by a chemical vapor deposition method (CVD), a high-temperature salt bath treatment method (TD method, TD-VC method), or the like. During forming of the male screw portion 4, it is preferable to supply a lubricant or air for lubrication and cooling to sliding contact portions between the tapered surfaces 35 and the first and second supported surface portions 9$a$, 9$b$. When a main body portion of the jig 13 and a portion including the tapered surface 35 are made of different materials, adhesiveness between a material forming the main body portion of the jig 13 and a material forming the portion including the tapered surface 35 can be improved by forming a vent hole in the jig 13.

Figure 4E:
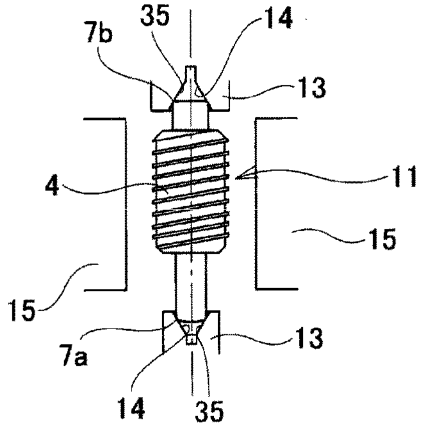

As described above, in a state where both axial end portions of the shaft member 1 are supported by the pair of jigs 13, the pair of round dies 15 approach the shaft member 1 from both radial sides while being rotated. Each of the pair of round dies 15 has screw cutting teeth (not shown) formed spirally on an outer peripheral surface thereof. Therefore, as shown in FIGS. 4C and 5, when the shaft member 1 is pressed between the pair of round dies 15 from both radial sides, the shaft member 1 rotates while the first and second supported surface portions 9$a$, 9$b$ are in sliding contact with the tapered surfaces 35 provided on the inner peripheral surfaces of the recessed portions 14 of the jigs 13. As a result, as shown in FIG. 4D, the male screw portion 4 formed by spirally forming the male screw groove 8 is rolled on the processing target portion 12 of the shaft member 1. Thereafter, as shown in FIG. 4E, the male shaft 11 including the male screw portion 4 is taken out by retracting the pair of round dies 15 in the radial direction and further retracting the pair of jigs 13 in the axial direction. Washing, finishing, a heat treatment, and the like are performed on the male shaft 11 obtained in this way as necessary so as to make the male shaft 11 into a finished shape. That is, in a rolling step in the present embodiment, since burr or protrusion excess portion 104$a$, 104$b$ (to be described later) with a small thickness can be prevented from being formed on the shaft member 1, it is not necessary to further perform processing (polishing processing or the like) after the heat treatment, and the heat treatment can be set as a final step in the method for manufacturing the male shaft 11. For example, when polishing processing or the like is performed on the male shaft 11 after heat treatment as in the related art, a very fine scratch may be generated on a ball rolling surface. However, since the heat treatment is the final step in the present embodiment, such a disadvantage can be solved.

In the present embodiment, when the male screw portion 4 is formed by the rolling processing, the tapered surfaces 35 provided on the inner peripheral surfaces of the recessed portions 14 of the pair of jigs 13 are pressed against the first and second supported surface portions 9$a$, 9$b$ of the first and second chamfered portions 7$a$, 7$b$ so as to position the shaft member 1 in the radial direction. That is, according to the method for manufacturing the shaft member 1 of the present embodiment, unlike the case of rolling the male screw portion on the outer peripheral surface of the material using a rolling machine described in JP-A-8-318340, it is not necessary to form the recessed holes for abutting the conical tip end portions provided in the jigs against the end surfaces on both axial sides of the material. Therefore, according to the manufacturing method of the present embodiment, after the male screw portion is formed on the outer peripheral surface of the material, it is not necessary to cut and remove the axial end portions of the material in a state where the material is supported by gripping the male screw portion. In short, according to the manufacturing method of the present embodiment, the male screw portion 4 can be prevented from being deformed, and the shape accuracy of the male screw portion 4 can be satisfactorily secured.

Further, in the present embodiment, the both axial end portions of the shaft member 1 are supported by pressing the tapered surfaces 35 provided on the inner peripheral surfaces of the recessed portions 14 of the pair of jigs 13 against the first and second chamfered portions 7$a$, 7$b$ respectively formed at the connection portions between the first and second end edges 5$a$, 5$b$ on both axial sides of the outer peripheral surface 2 and the first and second outer peripheral edges 6*a*, 6*b* of the first and second end surfaces 3*a*, 3*b* on both axial sides. Therefore, deformation in a bending direction can be less likely to occur (buckling deformation can be less likely to occur) even when a force in the axial direction is applied, as compared with a structure in which both axial end portions of the material are supported by abutting the conical tip end portions provided in the jigs against the inner peripheral surfaces of the recessed holes formed in the both axial end surfaces of the material, as in the method described in JP-A-8-318340. From this viewpoint as well, the shape accuracy of the male screw portion 4 can be satisfactorily secured.

Figure 15:
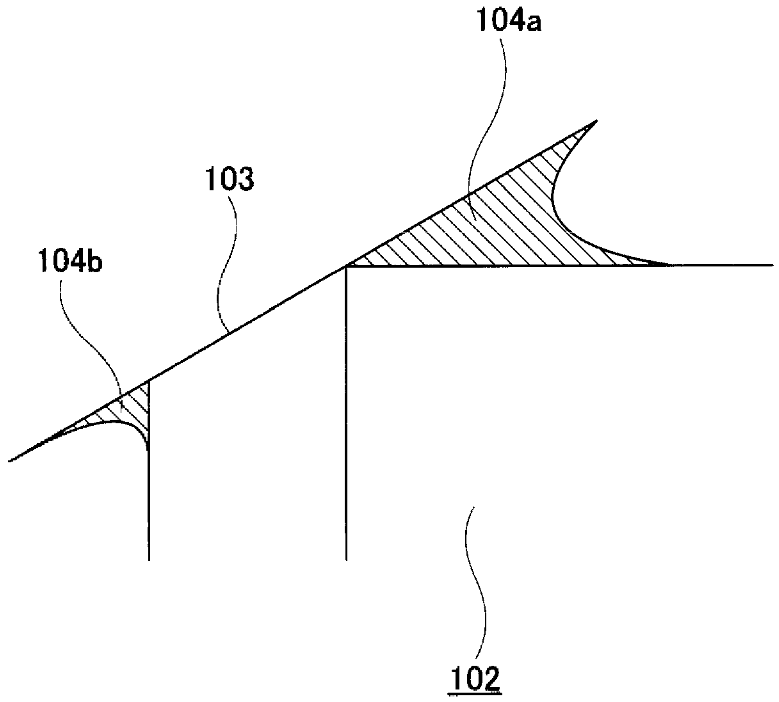
FIG. 15 is a partially enlarged view illustrating a problem of the method of rolling a male screw portion on an outer peripheral surface of a columnar material.

In the shaft member 1 of the present embodiment, the first and second end edges 5*a*, 5*b* of the outer peripheral surface 2 and the first and second outer peripheral edges 6*a*, 6*b* of the first and second end surfaces 3*a*, 3*b* are located radially inward than the generatrices α, β of the first and second supported surface portions 9*a*, 9*b* in the cross section in the axial direction. Therefore, in a state where the tapered surfaces 35 provided on the inner peripheral surfaces of the recessed portions 14 of the pair of jigs 13 are pressed against the first and second supported surface portions 9*a*, 9*b* of the first and second chamfered portions 7*a*, 7*b*, the first and second end edges 5*a*, 5*b* of the outer peripheral surface 2 of the shaft member 1 and the first and second outer peripheral edges 6*a*, 6*b* of the first and second end surfaces 3*a*, 3*b* are not in contact with the tapered surfaces 35. Therefore, even if the shaft member 1 is deformed as the tapered surfaces 35 provided on the inner peripheral surfaces of the recessed portions 14 of the jigs 13 are strongly pressed against the first and second supported surface portions 9*a*, 9*b* of the first and second chamfered portions 7*a*, 7*b* when the male screw portion 4 is rolled, the deformation can be retained in the connection inclined surface portions 10*a*1, 10*a*2, 10*b*1, 10*b*2 adjacent to the supported surface portions 9*a*, 9*b* in the axial direction. In other words, the deformation of the shaft member 1 can be reduced to such an extent that the connection inclined surface portions 10*a*1, 10*a*2, 10*b*1, 10*b*2 slightly bulge outward in the radial direction. In short, according to the manufacturing method of the present embodiment, the burr or protrusion excess portions 104*a*, 104*b* with a small thickness as shown in FIG. 15 can be prevented from being formed. In particular, in the present embodiment, since the connection inclined surface portions 10*a*1, 10*a*2, 10*b*1, 10*b*2 are disposed on both axial sides of the first and second supported surface portions 9*a*, 9*b*, it is possible to prevent both the formation of the excess portion 104*a* protruding in the radial direction from the axial end edge of the outer peripheral surface and the formation of the excess portion 104*b* protruding in the axial direction from the outer peripheral edge of the axial end surface. Therefore, it is not necessary to perform an operation (processing) of removing the excess portions 104*a*, 104*b* after the male screw portion 4 is formed, and the manufacturing cost of the male shaft 11 can be reduced.

Figure 5:
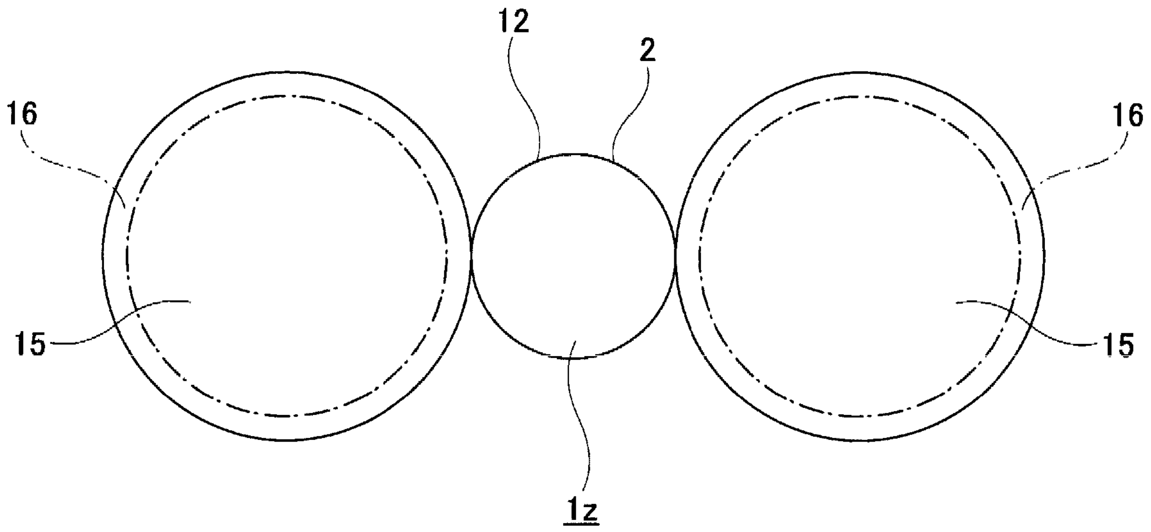
FIG. 5 is a cross-sectional view taken along a line C-C of FIG. 4(C).
Figure 6A:
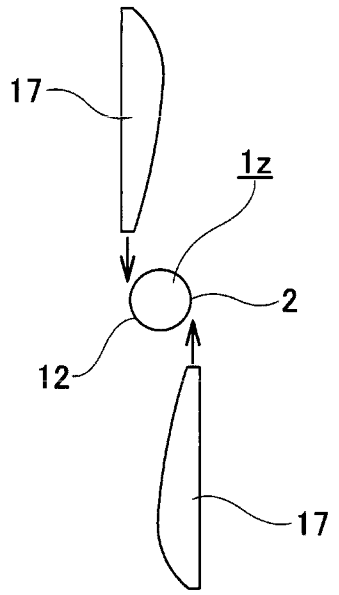
FIG. 6A and FIG. 6B are cross-sectional views showing another example of a method of forming a male screw portion by rolling processing.
Figure 6B:
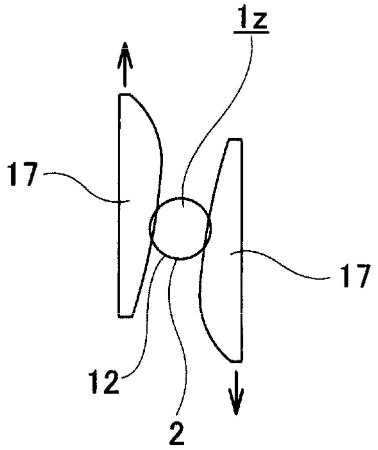

In the present embodiment, the male screw portion 4 is rolled by pressing the outer peripheral surface of the shaft member 1 from both radial sides between the pair of round dies 15 having the spiral screw cutting teeth 16 (not shown in FIGS. 4B to 4E, and shown in FIG. 5 only). However, the method of forming the male screw portion 4 is not particularly limited as long as the shaft member 1 is positioned in the radial direction by pressing the tapered surfaces 35 provided on the inner peripheral surfaces of the recessed portions 14 of the jigs 13 against the first and second supported surface portions 9*a*, 9*b* of the first and second chamfered portions 7*a*, 7*b*. For example, as shown in FIGS. 6A and 6B, the male screw portion 4 can be rolled by moving a pair of flat dies 17, that are disposed to face each other, toward or away from each other. Alternatively, the male screw portion 4 may be formed by processing other than the rolling processing (for example, cutting processing or the like). However, in this case, one end portion of the shaft member 1 needs to be gripped (chucked) by a rotation drive mechanism.

Figure 7:
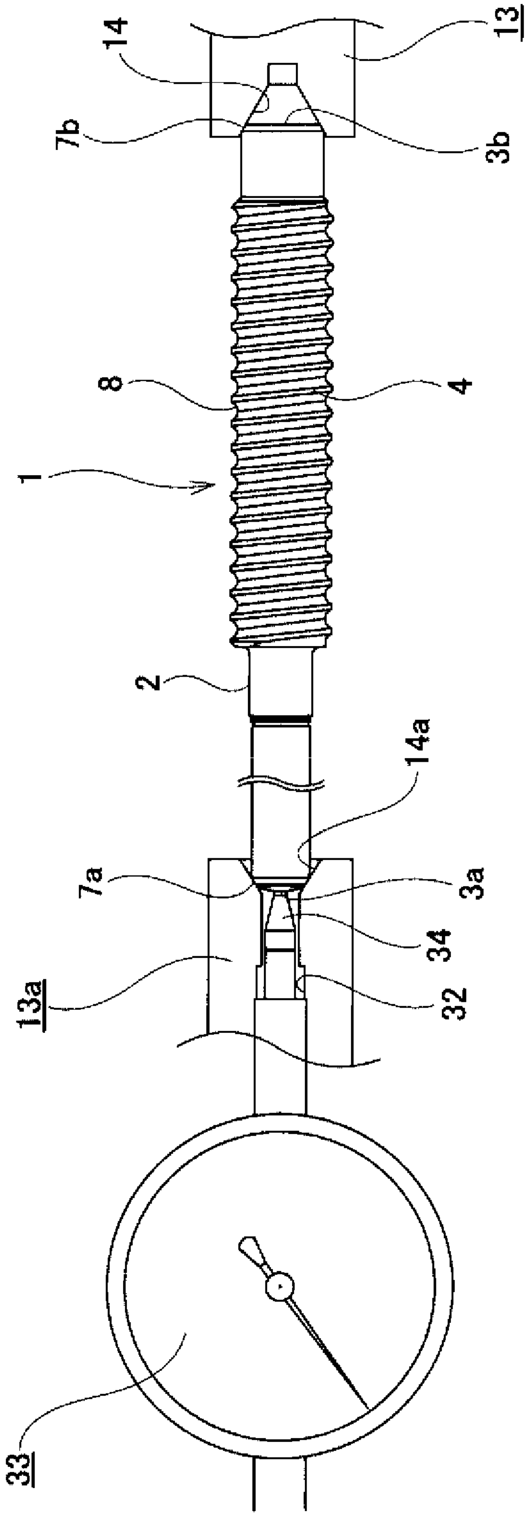
FIG. 7 is a side view showing a method of measuring an amount of runout of the shaft member.

Further, the case of carrying out the method for manufacturing the male shaft of the present invention can be configured such that, as shown in FIG. 7, a through hole 32 is formed in the jig 13*a* to open a bottom surface of the recessed portion 14*a*, and during the processing of the male screw portion 4, center runout of the shaft member 1 is measured by abutting a tip end portion of a probe 34 of a dial gauge 33 against the first end surface 3*a* on the one axial side of the shaft member 1 through the through hole 32. FIG. 7 shows the shaft member 1 in a state after the male screw portion 4 is formed. The center runout of the shaft member 1 may be configured to be measured by abutting the tip end portion of the probe 34 of the dial gauge 33 against the second end surface 3*b* on the other axial side of the shaft member 1.

Further, in the present embodiment, the male shaft 11 is used as a ball screw shaft configuring a feed screw mechanism of a ball screw type, and the male screw portion 4 in which the male screw groove 8 having an arc-shaped cross-sectional shape is spirally formed is formed on the outer peripheral surface 2, but the present invention is not limited to such a structure. Specifically, for example, the male shaft to which the present invention is applied can be applied to a screw shaft configuring a feed screw mechanism of a slide screw type. In this case, the male-side engagement portion provided on the outer peripheral surface is a male screw portion in which a male screw groove having a substantially trapezoidal or triangular cross-sectional shape is formed spirally. Alternatively, the male shaft to which the present invention is applied can be an inner shaft, and the male-side engagement portion can be a male spline portion or a male serration portion formed on the outer peripheral surface.

Second Embodiment

Figure 8:
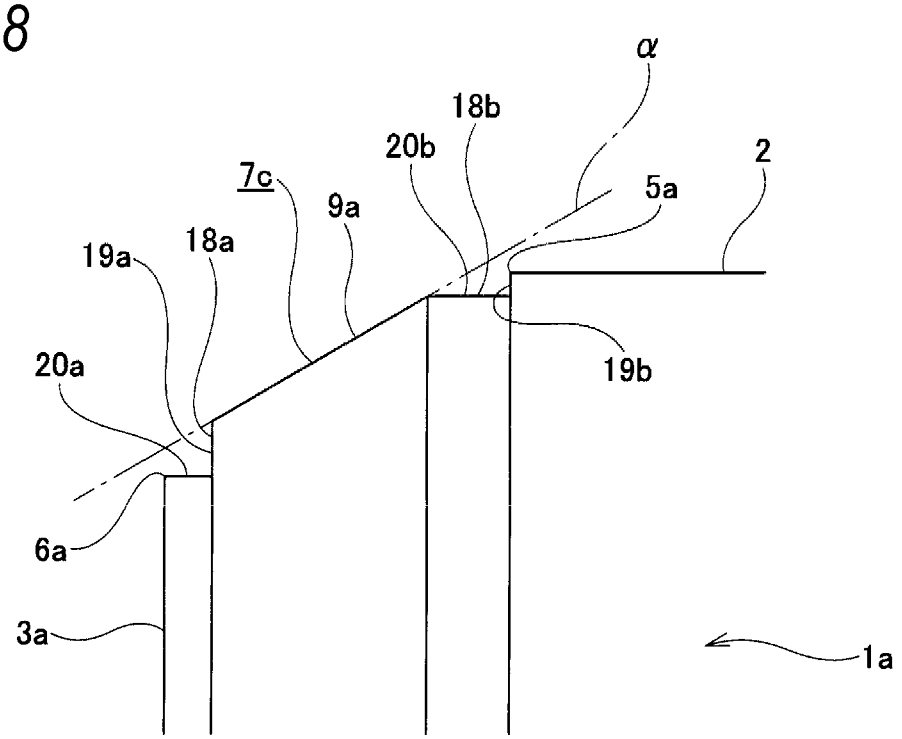
FIG. 8 is a view corresponding to FIG. 2 and showing a shaft member according to a second embodiment of the present invention.

FIG. 8 shows a second embodiment of the present invention. A shaft member 1*a* of the present embodiment includes a chamfered portion 7*c* at the connection portion between the first end edge 5*a* on the one axial side of the outer peripheral surface 2 and the first outer peripheral edge 6*a* of the first end surface 3*a* on the one axial side. In a cross section in the axial direction, the first end edge 5*a* of the outer peripheral surface 2 and the first outer peripheral edge 6*a* of the first end surface 3*a* are located radially inward than the generatrix (including an extension line of the generatrix) a of the first supported surface portion 9*a* disposed at an axially intermediate portion of the chamfered portion 7*c*. Therefore, the chamfered portion 7*c* includes a first supported surface portion 9*a* and a pair of step portions 18*a*, 18*b*.

The first supported surface portion 9*a* is a conical surface that is disposed at an axially intermediate portion of the first chamfered portion 7*c* and has a linear generatrix inclined radially outward as approaching the other axial side.

In the pair of step portions 18*a*, 18*b*, the step portion 18*a* on the one axial side connects the first outer peripheral edge 6*a* of the first end surface 3*a* and an end edge on the one axial side of the first supported surface portion 9*a*. The step portion 18*a* includes a circular ring-shaped flat surface portion 19*a* that is bent radially inward from the end edge on the one axial side of the first supported surface portion 9*a*, and a cylindrical surface portion 20*a* which is bent toward the one axial side from an inner peripheral edge of the flat surface portion 19*a*, and whose end edge on the one axial side is connected to the first outer peripheral edge 6*a* of the first end surface 3*a*.

In the pair of step portions 18*a*, 18*b*, the step portion 18*b* on the other axial side connects an end edge on the other axial side of the first supported surface portion 9*a* and the first end edge 5*a* on the one axial side of the outer peripheral surface 2. The step portion 18*b* includes a circular ring-shaped flat surface portion 19*b* that is bent radially inward from the first end edge 5*a* on the one axial side of the outer peripheral surface 2, and a cylindrical surface portion 20*b* which is bent toward the one axial side from an inner peripheral edge of the flat surface portion 19*b*, and whose end edge on the one axial side is connected to the end edge on the other axial side of the first supported surface portion 9*a*.

In the present embodiment, the first end edge 5*a* on the one axial side of the outer peripheral surface 2 of the shaft member 1*a* and the first outer peripheral edge 6*a* of the first end surface 3*a* are also not in contact with the tapered surface 35 in a state where the tapered surface 35 provided on the inner peripheral surface of the recessed portion 14 of the jig 13 (see FIGS. 1A and 1B) is pressed against the first supported surface portion 9*a* of the chamfered portion 7*c*. Therefore, even if the shaft member 1 is deformed as the tapered surface 35 provided on the inner peripheral surface of the recessed portion 14 of the jig 13 is strongly pressed against the first supported surface portion 9*a* of the first chamfered portion 7*a* when the male screw portion 4 is rolled, the deformation can be retained in the step portions 18*a*, 18*b* that are axially adjacent to the first supported surface portion 9*a*. In short, the burr or protrusion excess portions 104*a*, 104*b* with a small thickness as shown in FIG. 15 can be prevented from being formed. The configuration and the operation and effect of other portions are the same as those of the first embodiment.

Although the chamfered portion 7*c* of the present embodiment is provided at the connection portion between the first end edge 5*a* on the one axial side of the outer peripheral surface 2 and the first outer peripheral edge 6*a* of the first end surface 3*a* on the one axial side, the chamfered portion 7*c* may be provided at the connection portion between the second end edge 5*b* on the other axial side of the outer peripheral surface 2 and the second outer peripheral edge 6*b* of the second end surface 3*b* on the other axial side.

Third Embodiment

Figure 9:
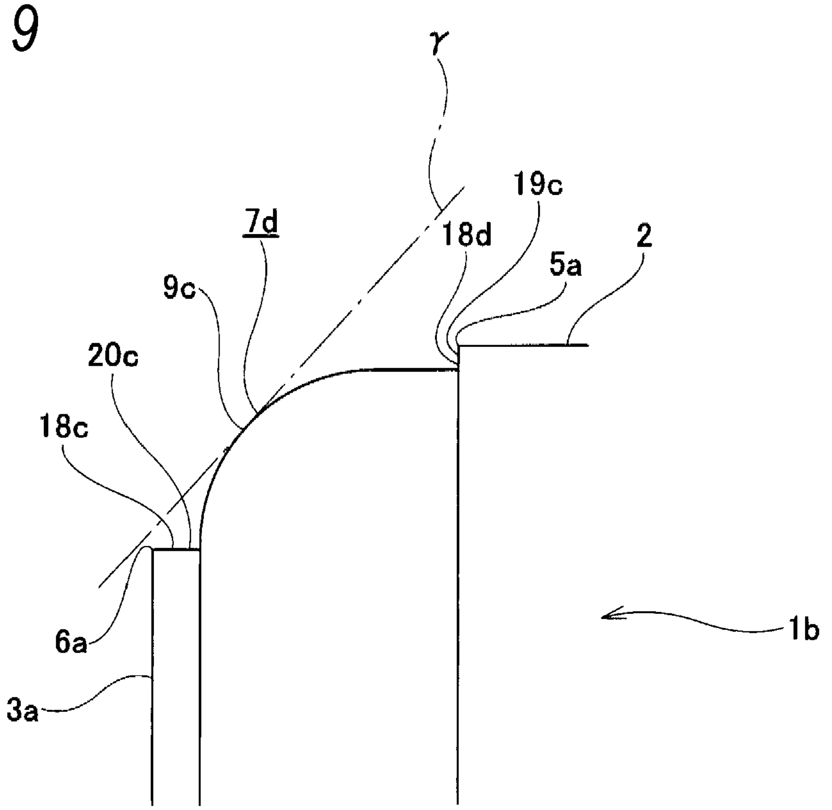
FIG. 9 is a view corresponding to FIG. 2 and showing a shaft member according to a third embodiment of the present invention.

FIG. 9 shows a third embodiment of the present invention. A shaft member 1*b* of the present embodiment includes a chamfered portion 7*d* at the connection portion between the first end edge 5*a* on the one axial side of the outer peripheral surface 2 and the first outer peripheral edge 6*a* of the first end surface 3*a* on the one axial side. In the cross section in the axial direction, the first end edge 5*a* of the outer peripheral surface 2 and the first outer peripheral edge 6*a* of the first end surface 3*a* are located radially inward than a tangent line γ at an axially intermediate portion of a supported surface portion 9*c*, that is disposed at an axially intermediate portion of a chamfered portion 7*d*. Therefore, the chamfered portion 7*d* includes a supported surface portion 9*c* and a pair of step portions 18*c*, 18*d*.

The supported surface portion 9*c* is disposed at an axially intermediate portion of the chamfered portion 7*d*, and is a convex curved surface having an arc-shaped generatrix inclined radially outward as approaching the other axial side.

In the pair of step portions 18*c*, 18*d*, the step portion 18*c* on the one axial side connects the first outer peripheral edge 6*a* of the first end surface 3*a* and an end edge on the one axial side of the first supported surface portion 9*c*. The step portion 18*c* includes a cylindrical surface portion 20*c* that is bent toward the other axial side from the first outer peripheral edge 6*a* of the first end surface 3*a* on the one axial side, and whose end edge on the other axial side is connected to an end edge on the one axial side of the supported surface portion 9*c*.

In the pair of step portions 18*c*, 18*d*, the step portion 18*d* on the other axial side connects an end edge on the other axial side of the supported surface portion 9*c* and the first end edge 5*a* on the one axial side of the outer peripheral surface 2. The step portion 18*d* on the other axial side includes a circular ring-shaped flat surface portion 19*c* which is bent radially inward from the first end edge 5*a* on the one axial side of the outer peripheral surface 2, and whose inner peripheral edge is connected to an end edge on the other axial side of the supported surface portion 9*c*.

In the present embodiment, the first end edge 5*a* on the one axial side of the outer peripheral surface 2 of the shaft member 1*a* and the first outer peripheral edge 6*a* of the first end surface 3*a* are also not in contact with the tapered surface 35 in a state where the tapered surface 35 provided on the inner peripheral surface of the recessed portion 14 of the jig 13 is pressed against the axially intermediate portion of the supported surface portion 9*c* of the chamfered portion 7*d*. Therefore, when the male screw portion 4 is rolled, deformation caused by strongly pressing the tapered surface 35 provided on the inner peripheral surface of the recessed portion 14 of the jig 13 against the axially intermediate portion of the supported surface portion 9*c* of the chamfered portion 7*d* can be retained in the step portions 18*c*, 18*d*. The configuration and the operation and effect of other portions are the same as those of the first embodiment and the second embodiment.

Although the chamfered portion 7*d* of the present embodiment is provided at the connection portion between the first end edge 5*a* on the one axial side of the outer peripheral surface 2 and the first outer peripheral edge 6*a* of the first end surface 3*a* on the one axial side, the chamfered portion 7*d* may be provided at the connection portion between the second end edge 5*b* on the other axial side of the outer peripheral surface 2 and the second outer peripheral edge 6*b* of the second end surface 3*b* on the other axial side.

Fourth Embodiment

Figure 10:
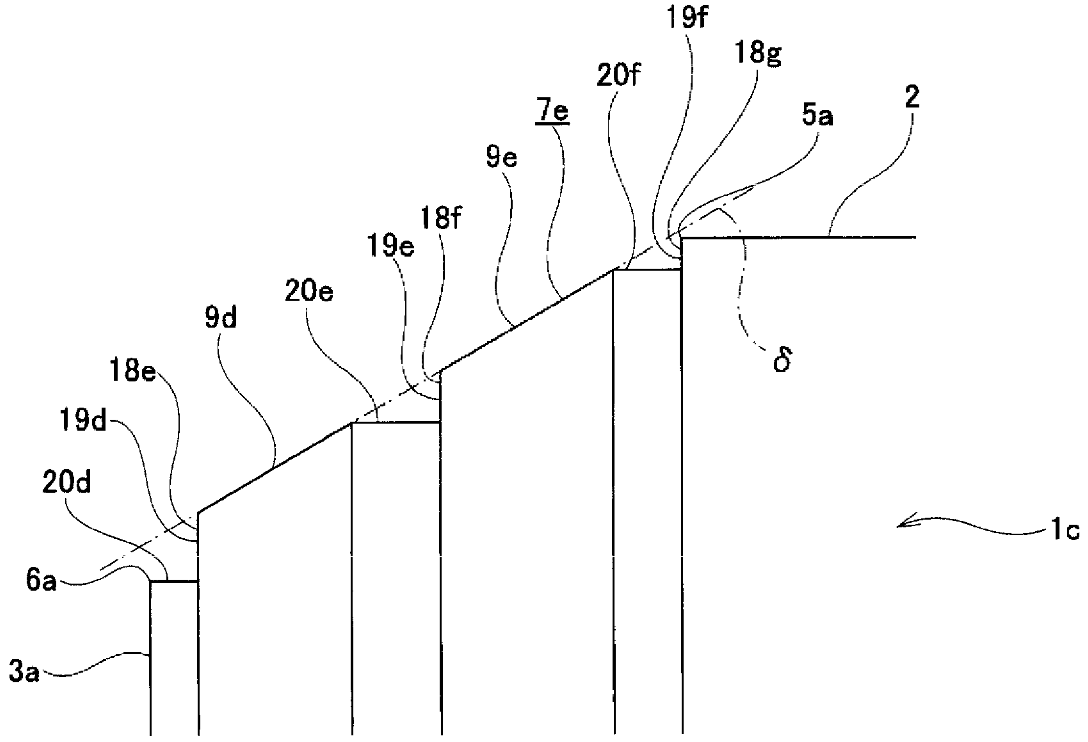
FIG. 10 is a view corresponding to FIG. 2 and showing a shaft member according to a fourth embodiment of the present invention.

FIG. 10 shows a fourth embodiment of the present invention. A shaft member 1*c* of the present embodiment includes a chamfered portion 7*e* at the connection portion between the first end edge 5*a* on the one axial side of the outer peripheral surface 2 and the first outer peripheral edge 6*a* of the first end surface 3*a* on the one axial side. The chamfered portion 7*e* has a two-stage structure including a pair of supported surface portions 9*d*, 9*e* and three step portions 18*e* to 18*g*.

The pair of supported surface portions 9*d*, 9*e* are disposed at two positions on an axially intermediate portion of the chamfered portion 7*e* and each are a conical surface having a linear generatrix inclined radially outward as approaching the other axial side. The pair of supported surface portions 9*d* and 9*e* exist on the same conical surface. In a cross section in the axial direction, the first end edge 5*a* of the outer peripheral surface 2 and the first outer peripheral edge 6*a* of the first end surface 3*a* are located radially inward than a generatrix δ of the pair of supported surface portions 9*d*, 9*e* disposed at two positions on the axially intermediate portion of the chamfered portion 7*e*.

Among the three step portions 18*e* to 18*g*, the step portion 18*e* connects the first outer peripheral edge 6*a* of the first end surface 3*a* on the one axial side and an one axial side edge of the supported surface portion 9*d* on the one axial side. The step portion 18*e* includes a circular ring-shaped flat surface portion 19*d* that is bent radially inward from the one axial side edge of the supported surface portion 9*d* on the one axial side, and a cylindrical surface portion 20*d* which is bent toward the one axial side from an inner peripheral edge of the flat surface portion 19*d* and whose one axial side edge is connected to the first outer peripheral edge 6*a* of the first end surface 3*a* on the one axial side.

Among the three step portions 18*e* to 18*g*, the step portion 18*f* connects the other axial side edge of the supported surface portion 9*d* on the one axial side and an one axial side edge of the supported surface portion 9*e* on the other axial side. The step portion 18*f* includes a circular ring-shaped flat surface portion 19*e* that is bent radially inward from the one axial side edge of the supported surface portion 9*e* on the other axial side, and a cylindrical surface portion 20*e* which is bent toward the one axial side from the flat surface portion 19*e* and whose one axial side edge is connected to the other axial side edge of the supported surface portion 9*d* on the one axial side.

Among the three step portions 18*e* to 18*g*, the step portion 18*g* connects the other axial side edge of the supported surface portion 9*e* on the other axial side and the first end edge 5*a* on the one axial side of the outer peripheral surface 2. The step portion 18*g* includes a circular ring-shaped flat surface portion 19*f* that is bent radially inward from the first end edge 5*a* on the one axial side of the outer peripheral surface 2, and a cylindrical surface portion 20*f* which is bent toward the one axial side from the flat surface portion 19*f* and whose one axial side edge is connected to the other axial side edge of the supported surface portion 9*e* on the other axial side.

According to the present embodiment, when the male screw portion 4 is formed by rolling processing, a gap can be present over an entire periphery between the tapered surface 35 and the middle step portion 18*f* among the three step portions 18*e* to 18*g* in a state where the tapered surface 35 provided on the inner peripheral surface of the recessed portion 14 of the jig 13 is pressed against the pair of supported surface portions 9*d*, 9*e* of the chamfered portion 7*e*. In present embodiment, grease can be held in such a gap, and when the male screw portion 4 is formed, the chamfered portion 7*e* of the shaft member 1*c* can be smoothly slid with respect to the tapered surface 35. Further, when the male screw portion 4 is rolled, deformation caused by strongly pressing the tapered surface 35 against the pair of supported surface portions 9*d*, 9*e* of the chamfered portion 7*e* can be absorbed by the middle step portion 18*f* to some extent, and an amount of deformation of the step portions 18*e*, 18*g* on both axial sides can be reduced. The configuration and the operation and effect of other portions are the same as those of the first embodiment and the second embodiment.

Although the chamfered portion 7*e* of the present embodiment is provided at the connection portion between the first end edge 5*a* on the one axial side of the outer peripheral surface 2 and the first outer peripheral edge 6*a* of the first end surface 3*a* on the one axial side, the chamfered portion 7*e* may be provided at a connection portion between the second end edge 5*b* on the other axial side of the outer peripheral surface 2 and the second outer peripheral edge 6*b* of the second end surface 3*b* on the other axial side.

Fifth Embodiment

Figure 11:
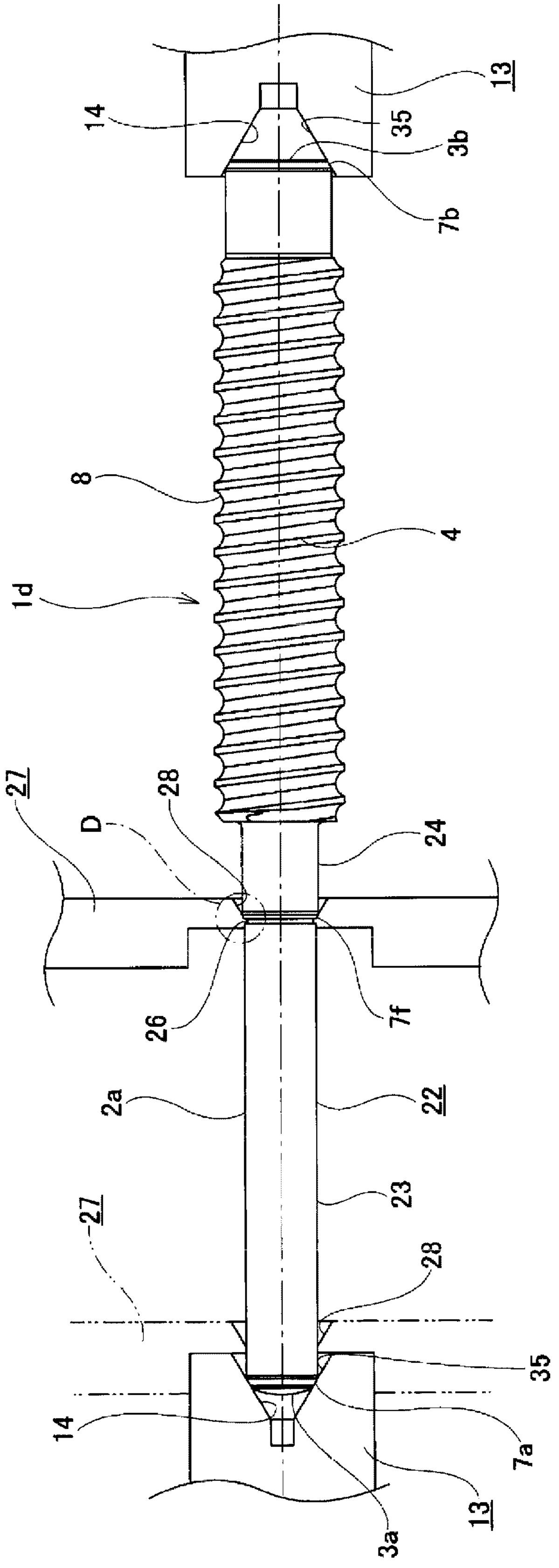
FIG. 11 is a side view showing a shaft member according to a fifth embodiment of the present invention.
Figure 12:
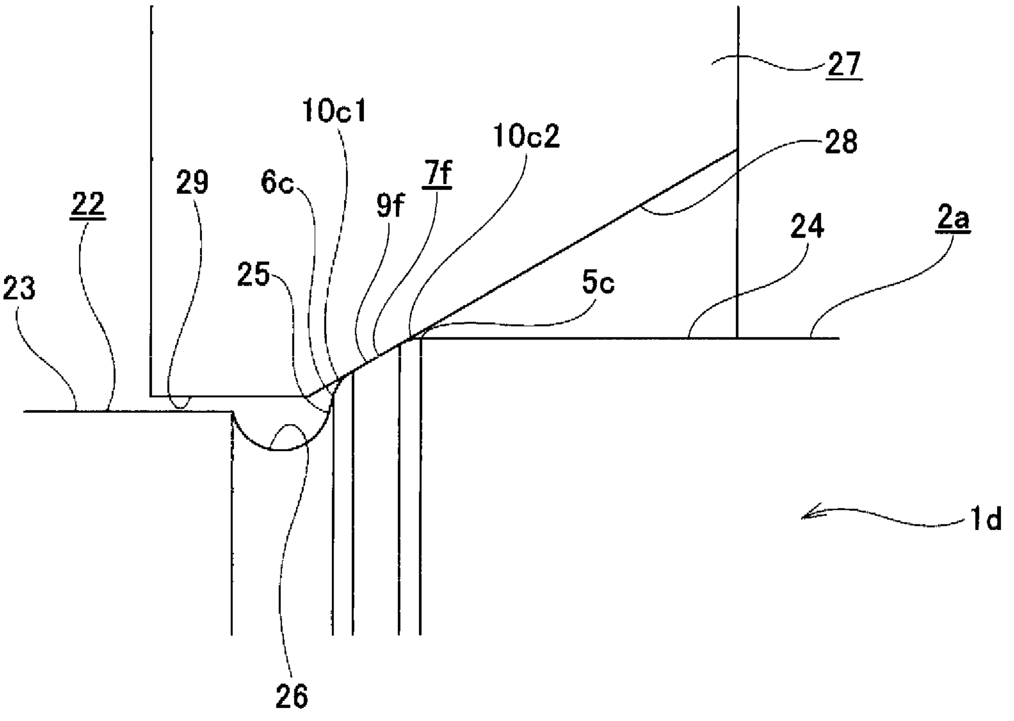
FIG. 12 is an enlarged view of a portion D in FIG. 11.

FIGS. 11 and 12 show a fifth embodiment of the present invention. A shaft member 1*d* of the present embodiment includes a chamfered portion 7*f* at an axially intermediate portion of the shaft member 1*d* in addition to the first and second chamfered portions 7*a*, 7*b* respectively formed at connection portions between the first and second end edges 5*a*, 5*b* on both axial sides of an outer peripheral surface 2*a* and the first and second outer peripheral edges 6*a*, 6*b* of the first and second end surfaces 3*a*, 3*b* on both axial sides. Therefore, the shaft member 1*d* of the present embodiment includes a stepped cylindrical portion 22 at a portion of an outer peripheral surface 2*a* which is deviated to the one axial side from a portion where the male screw portion 4 is formed. In the stepped cylindrical portion 22, a small-diameter cylindrical portion 23 on the one axial side and a large-diameter cylindrical portion 24 on the other axial side are connected by a step surface 25 facing the one axial side.

The chamfered portion 7*f* is formed at a connection portion between an end edge 5*c* on the one axial side of the large-diameter cylindrical portion 24 and an outer peripheral edge 6*c* of the step surface 25. The chamfered portion 7*f* includes a supported surface portion 9*f* and a pair of connection inclined surface portions 10*c*1, 10*c*2. In the present embodiment, the supported surface portion 9*f* is a conical surface having a linear generatrix. Further, in a cross section in the axial direction (a cross section including the central axis O of the shaft member 1*d*), the end edge 5*c* on the one axial side of the large-diameter cylindrical portion 24 and the outer peripheral edge 6*c* of the step surface 25 are located radially inward than a generatrix (including an extension line of the generatrix) of the supported surface portion 9*f*. FIG. 11 shows the shaft member 1*d* in a state after the male screw portion 4 is formed.

The supported surface portion 9*f* is a conical surface that is disposed at an axially intermediate portion of the chamfered portion 7*f* and has a linear generatrix inclined radially outward as approaching the other axial side.

In the pair of connection inclined surface portions 10*c*1, 10*c*2, the connection inclined surface portion 10*c*1 on the one axial side connects the outer peripheral edge 6*c* of the step surface 25 and an end edge on the one axial side of the supported surface portion 9*f*. The connection inclined surface portion 10*c*1 is a convex curved surface having an arc-shaped generatrix inclined radially outward as approaching the other axial side.

In the pair of connection inclined surface portions 10*c*1, 10*c*2, the connection inclined surface portion 10*c*2 on the other axial side connects an end edge on the other axial side of the supported surface portion 9*f* and the end edge 5*c* on the one axial side of the large-diameter cylindrical portion 24.

The connection inclined surface portion 10*c*2 is a convex curved surface having an arc-shaped generatrix inclined radially outward as approaching the other axial side.

Further, the shaft member 1*d* is provided with a recessed groove 26, which is recessed radially inward, at an end portion on the other axial side of the small-diameter cylindrical portion 23 over an entire periphery thereof.

In the present embodiment, when the male screw portion 4 is formed by the rolling processing, as shown in FIG. 11, the shaft member 1*d* is supported by pressing the tapered surfaces 35 provided on the inner peripheral surfaces of the recessed portions 14 of the pair of jigs 13 against the first and second supported surface portions 9*a*, 9*b* of the first and second chamfered portions 7*a*, 7*b* formed on both axial end portions of the shaft member 1*d*, and pressing a tapered surface 28 provided on another jig 27 against the supported surface portion 9*f* of the chamfered portion 7*f* formed at the axially intermediate portion of the shaft member 1*d*. The jig 27 has a circular hole 29 penetrating in the axial direction, and the tapered surface 28, inclined in a direction in which an inner diameter thereof increases as approaching the other axial side, at a portion on the other axial side of an inner peripheral surface of the circular hole 29. The circular hole 29 has an inner diameter larger than an outer diameter of the small-diameter cylindrical portion 23 of the shaft member 1*d* (a portion of the small-diameter cylindrical portion 23 that is deviated in the axial direction from a portion where the recessed groove 26 is present).

When the male screw portion 4 is formed, first, in a state where an end surface on the one axial side of the jig 27 overlaps a tip end surface (an end surface on the other axial side) of the jig 13 on the one axial side in the pair of jigs 13, as shown by a two-dot chain line in FIG. 11, the tapered surface 35 provided on the inner peripheral surface of the recessed portion 14 of the jig 13 on the one axial side is pressed against the first support surface portion 9*a* of the first chamfered portion 7*a* on the one axial side. Next, the jig 27 is slid toward the other axial side, and the tapered surface 28 is pressed against the supported surface portion 9*f* of the chamfered portion 7*f* at the middle in the axial direction.

In the present embodiment, in a state where the tapered surface 28 of the jig 27 is pressed against the supported surface portion 9*f* of the chamfered portion 7*f*, the end edge 5*c* on the one axial side of the large-diameter cylindrical portion 24 of the shaft member 1*d* and the outer peripheral edge 6*c* of the step surface 25 are not in contact with the tapered surface 28. Therefore, even if the shaft member 1*d* is deformed by strongly pressing the tapered surface 28 of the jig 27 against the supported surface portion 9*f* of the chamfered portion 7*f* when the male screw portion 4 is rolled, the deformation can be retained in the connection inclined surface portions 10*c*1, 10*c*2 axially adjacent to the supported surface portion 9*f*.

According to the present embodiment, since the axially intermediate portion can be supported in addition to the both axial end portions of the shaft member 1*d*, even when an axial dimension of a portion of the outer peripheral surface 2 of the shaft member 1*d* that is deviated from the male screw portion 4 is long to some extent, the shaft member 1*d* can be prevented from being bent and deformed (bucked).

Further, in the present embodiment, grease can be held in the recessed groove 26 provided in the end portion on the other axial side of the small-diameter cylindrical portion 23 of the shaft member 1*d*, and therefore, the chamfered portion 7*f* of the shaft member 1*d* can be smoothly slid with respect to the tapered surface 28 of the jig 27 when the male screw portion 4 is formed. The configuration and the operation and effect of other portions are the same as those of the first embodiment.

The stepped cylindrical portion 22 of the present embodiment is provided in a portion of the outer peripheral surface 2*a* that is deviated to the one axial side from a portion where the male screw portion 4 is formed, but the stepped cylindrical portion 22 be provided in a portion of the outer peripheral surface 2*a* that is deviated to the other axial side from the portion where the male screw portion 4 is formed.

Sixth Embodiment

Figure 13:
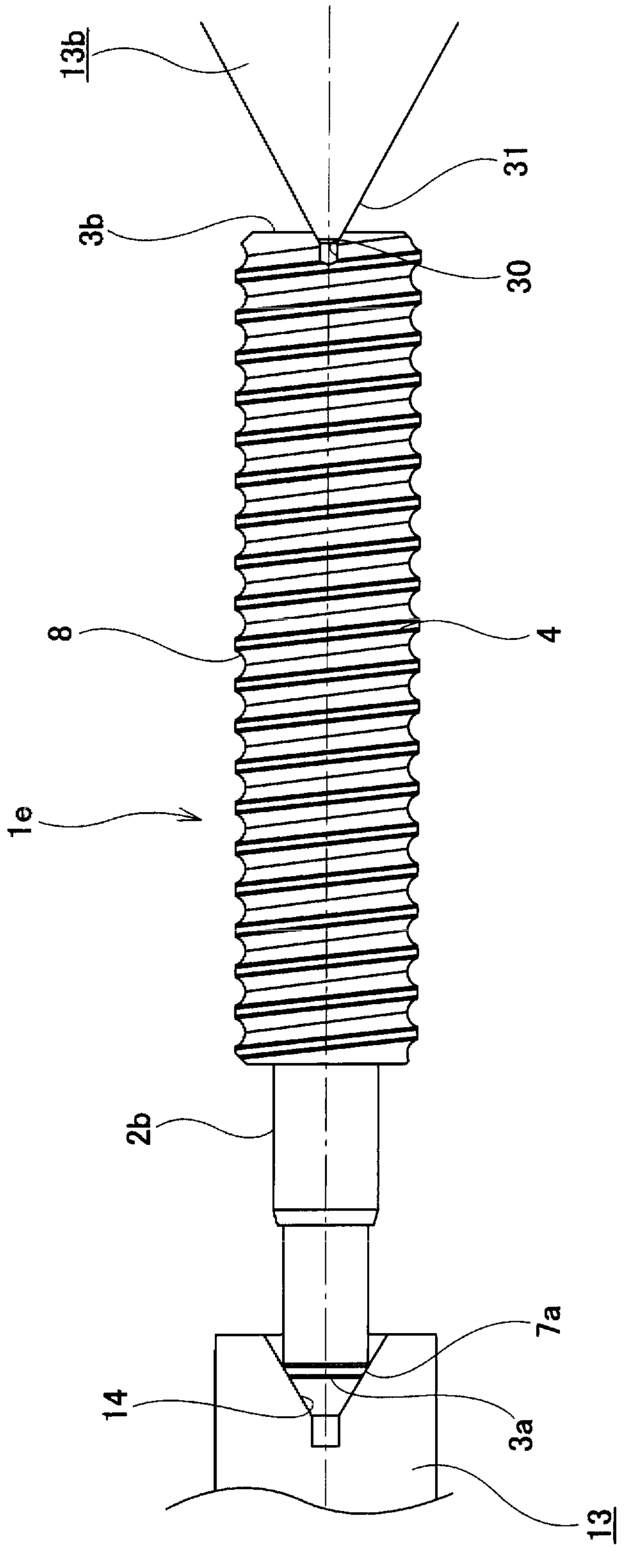
FIG. 13 is a side view showing a shaft member according to a sixth embodiment of the present invention.
Figure 14:
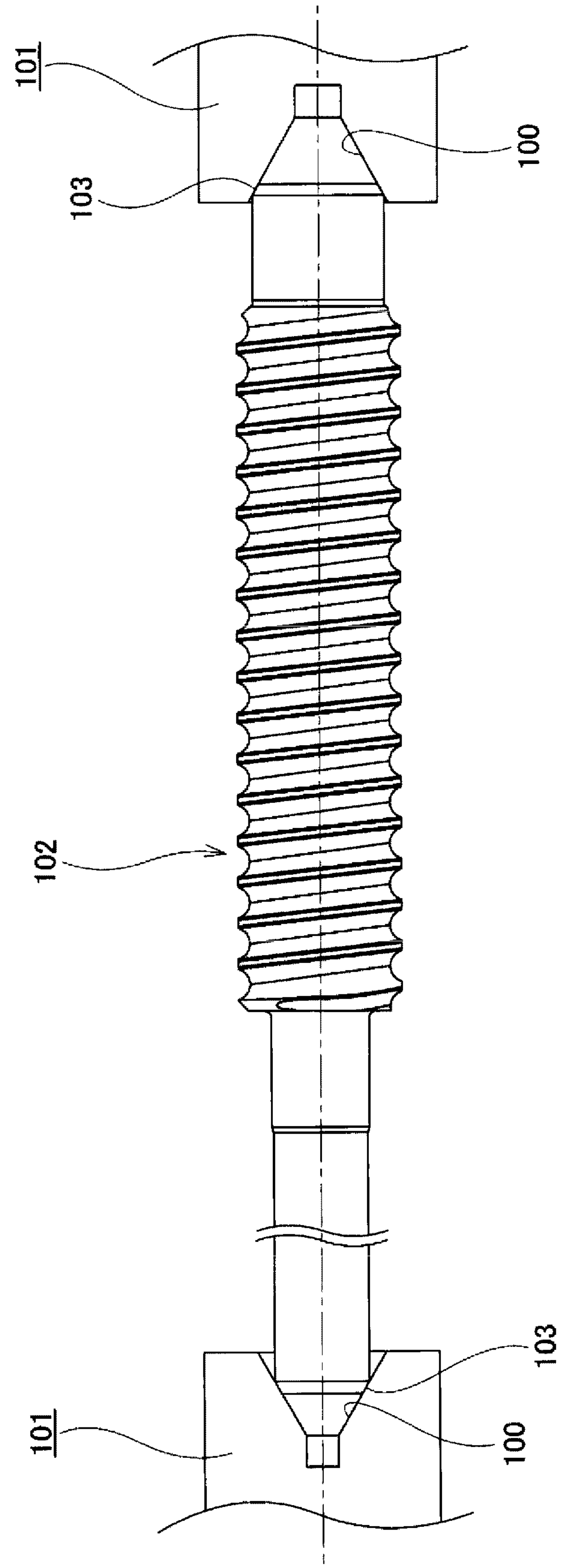
FIG. 14 is a side view illustrating a method of rolling a male screw portion on an outer peripheral surface of a columnar material.

FIG. 13 shows a sixth embodiment of the present invention. A shaft member 1*e* of the present embodiment includes the male screw portion 4 in a range from an axially intermediate portion to an end edge on the other axial side on an outer peripheral surface 2*b*. That is, the shaft member 1*e* of the present embodiment includes only the first chamfered portion 7*a* at the connection portion between the first end edge 5*a* on the one axial side of the outer peripheral surface 2*b* and the first outer peripheral edge 6*a* of the first end surface 3*a* on the one axial side, and includes a recessed hole 30 having a conical concave surface shape at a central portion of the second end surface 3*b* on the other axial side. FIG. 13 shows the shaft member 1*e* in a state after the male screw portion 4 is formed.

In the present embodiment, when the male screw portion 4 is formed by the rolling processing, the shaft member 1*e* is supported by pressing the tapered surface 35 provided on the inner peripheral surface of the recessed portion 14 of the jig 13 against the first supported surface portion 9*a* of the first chamfered portion 7*a* formed on one axial end portion of the shaft member 1*e*, and abutting an outer peripheral surface of the tip end portion 31 provided on the jig 13*b* against an inner peripheral surface of the recessed hole 30 formed in the end surface 3*b* on the other axial side of the shaft member 1*e*. The configuration and the operation and effect of other portions are the same as those of the first embodiment.

The shaft member 1*e* of the present embodiment includes the male screw portion 4 in a range from the axially intermediate portion to the end edge on the other axial side on the outer peripheral surface 2*b*, but may include the male screw portion 4 in a range from the axially intermediate portion to the one axial side on the outer peripheral surface 2*b*. In this case, the shaft member 1*e* includes only the second chamfered portion 7*b* at the connection portion between the second end edge 5*b* on the other axial side of the outer peripheral surface 2*b* and the second outer peripheral edge 6*b* of the second end surface 3*b* on the other axial side, and includes the recessed hole 30 having a conical concave surface shape at a central portion of the first end surface 3*a* on the one axial side.

The structures of the first to sixth embodiments described above can be implemented in appropriate combinations as long as the embodiments do not cause a contradiction.

The shaft member of the present invention is not limited to the first to sixth embodiments described above. That is, the shaft member of the present invention can include a chamfered portion including at least one supported surface portion disposed at an axially intermediate portion thereof on at least one connection portion in connection portions between an outer peripheral surface and an axial side surface that is an axial end surface or a step surface, and can have a structure in which in a cross section in the axial direction, an axial end edge of the outer peripheral surface and an outer peripheral edge of the axial side surface are located radially inward than a tangent line at an axially intermediate portion of the supported surface portion. Specifically, for example, the shaft member of the present invention can have a structure having only the chamfered portion 7*f* formed at the connection portion between the large-diameter cylindrical portion 24 and the step surface 25 as in the fifth embodiment shown in FIG. 11, or can have a structure having only the first chamfered portion 7*a* at the connection portion between the first end edge 5*a* on the one axial side of the outer peripheral surface 2*b* and the first outer peripheral edge 6*a* of the first end surface 3*a* on the one axial side as in the sixth embodiment shown in FIG. 13.

The method for manufacturing a male shaft of the present invention is not limited to the first embodiment to the sixth embodiment described above. That is, the method for manufacturing a male shaft of the present invention can includes a step of performing processing for forming the male-side engagement portion on the outer peripheral surface of the shaft member in a state where the shaft member is positioned in the radial direction by pressing at least the axially intermediate portion of the supported surface portion of the at least one chamfered portion provided on the shaft member against the tapered surface provided on the jig. Specifically, for example, the method for manufacturing the male shaft of the present invention can include a step of performing processing for forming the male-side engagement portion in a state where the axially intermediate portion of the shaft member is supported by pressing the tapered surface 28 of the jig 27 against only the chamfered portion 7*f* formed at the connection portion between the large-diameter cylindrical portion 24 and the step surface 25, as in the fifth embodiment shown in FIG. 11. In this case, recessed holes each having a conical concave surface shape are formed in the end surfaces on both axial sides of the shaft member and both axial end portions of the shaft member are supported by abutting a conical outer peripheral surface of a tip end portion provided on the jig against an inner peripheral surface of the recessed hole. Further, the shaft member 1*e* can also be supported by pressing the tapered surface 35 provided on the inner peripheral surface of the recessed portion 14 of the jig 13 against the first support surface portion 9*a* of the first chamfered portion 7*a* formed on the one axial end portion of the shaft member 1*e*, and abutting the outer peripheral surface of the conical tip end portion 31 provided on the jig 13*b* against the recessed hole 30 formed on the end surface 3*b* on the other axial side of the shaft member 1*e*, as in the sixth embodiment shown in FIG. 13.

In the shaft member of the present invention, for example, the chamfered portion may include a supported surface portion having an arc-shaped cross-sectional shape and a pair of connection inclined surface portions each having an arc-shaped cross-sectional shape. In this case, a curvature radius of the supported surface portion is set to be larger than a curvature radius of each of the connection inclined surface portions.

Figure 16:
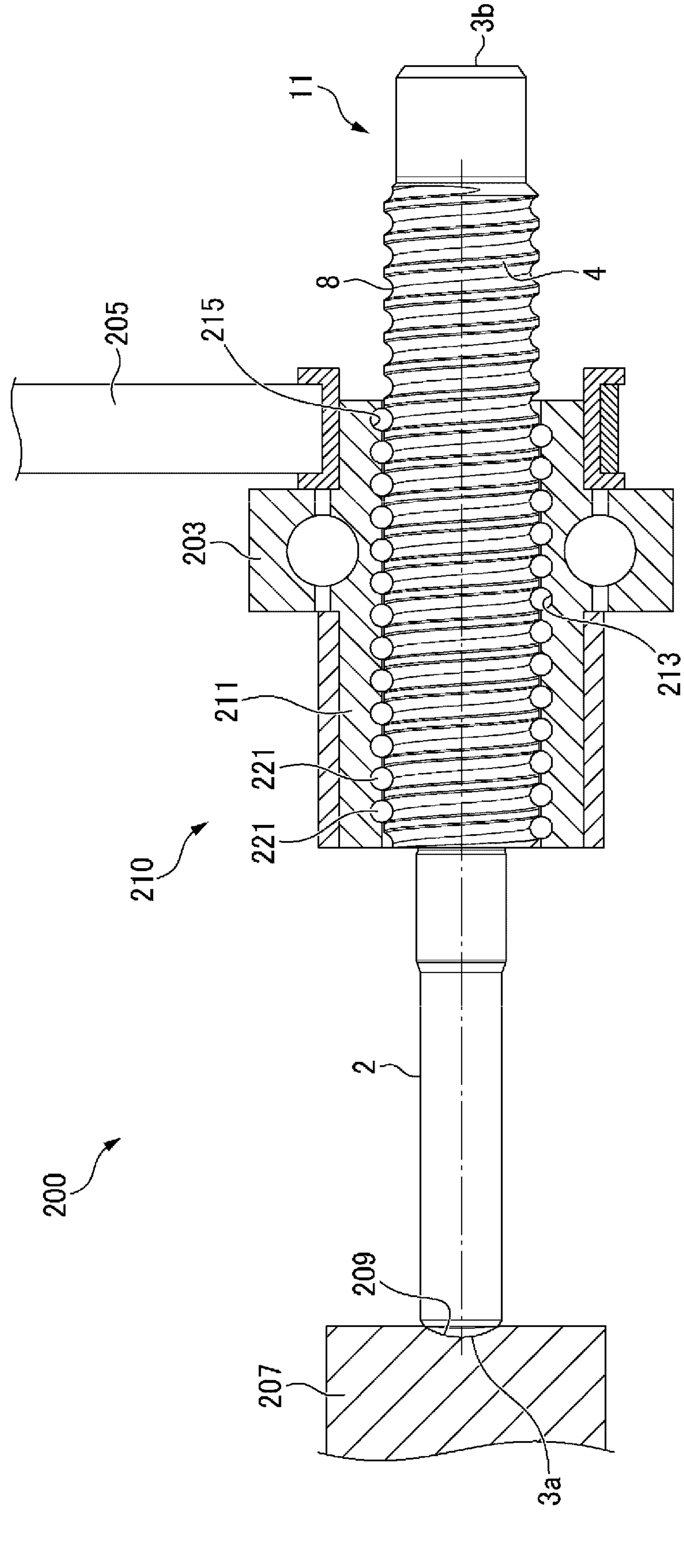
FIG. 16 is a cross-sectional view of a main part for a brake actuator including the shaft member of the first embodiment.

The male shaft 11 of the present invention can be applied as a screw shaft for a brake actuator. FIG. 16 shows a cross-sectional view of a main part of a brake actuator 200 in a case where the male shaft 11 of the first embodiment is applied as a screw shaft for a brake actuator.

The brake actuator 200 is used for a vehicle, and is fixed to a suspension device of a vehicle body via a bracket, a housing, or the like. The brake actuator 200 includes a ball screw 210 that is used for nut rotation, a bearing 203 that rotatably supports the ball screw 210 in a housing (not shown), a belt 205 that is connected to a motor or the like and drives a nut 211 (to be described later) of the ball screw 210, and a pressed member 207 that is pressed by the male shaft 11 of the ball screw 210. The nut 211 is not limited to being driven by the belt 205, and may be driven by a gear or the like.

The ball screw 210 includes the male shaft 11, the nut 211, a rolling path 215 formed between the male screw groove 8 on the outer peripheral surface of the male shaft 11 and a female screw groove 213 on an inner peripheral surface of the nut 211, and a plurality of balls 221 disposed in the rolling path 215. A ball circulation method of the ball screw 210 is not particularly limited, and an end cap method, a flop over method, a return tube method, a guide plate method, and the like are appropriately applied.

A recessed portion 209 is formed in a side surface of the pressed member 207. A shape of the recessed portion 209 matches the shape of the first end surface 3*a* of the male shaft 11. Further, the first end surface 3*a* of the male shaft 11 is fitted into the recessed portion 209 of the pressed member 207, and thus the pressed member 207 is fixed to the male shaft 11.

In the brake actuator 200, the nut 211 is rotationally driven by a motor or the like via the belt 205, the male shaft 11 advances toward one axial side, and the pressed member 207 is pressed toward the one axial side. Accordingly, the pressed member 207 presses a brake pad against a brake disc, and a braking force is generated on the brake disc.

As described above, the male shaft 11 of the present application can be used as a screw shaft for a brake disc actuator. In particular, the male shaft 11 of the present application is preferable as a screw shaft of a brake actuator because of good shape accuracy.

The present application is based on Japanese Patent Application No. 2019-092097 filed on May 15, 2019, and the contents thereof are incorporated herein as reference.

The invention claimed is:

1. A shaft member comprising:
an outer peripheral surface;
at least one axial side surface facing an axial direction;
a chamfered portion formed at a connection portion between an axial end edge of the outer peripheral surface and an outer peripheral edge of the axial side surface; and
a processing target portion formed on at least a part of the outer peripheral surface, wherein
the chamfered portion includes a supported surface portion disposed at an axially intermediate portion of the chamfered portion and inclined radially outward as approaching the processing target portion in the axial direction,
the axial end edge of the outer peripheral surface and the outer peripheral edge of the axial side surface are located radially inward than a tangent line at an axially intermediate portion of the supported surface portion, in a cross section in the axial direction,
the chamfered portion connects the axial end edge of the supported surface portion with the axial end edge of the outer peripheral surface or the outer peripheral edge of the axial side, and a connection inclined surface portion or a step portion, and
the connection inclined surface portion or the step portion is configured to absorb an elongation of the shaft member when the supported surface portion is pressed in a radial direction.

2. The shaft member according to claim 1, wherein
the supported surface portion is a conical surface having a linear generatrix.

3. The shaft member according to claim 1, wherein
the supported surface portion is a convex curved surface having an arc-shaped generatrix.

4. The shaft member according to claim 1, wherein the chamfered portion further includes:
a first connection inclined surface portion that connects an axial end edge on a side axially close to the processing target portion in the axial end edge of the supported surface portion and the axial end edge of the outer peripheral surface, and that is inclined radially outward as approaching the processing target portion in the axial direction, or
a first step portion that has a circular ring-shaped flat surface portion bent radially inward from at least the axial end edge of the outer peripheral surface.

5. The shaft member according to claim 1, wherein the chamfered portion further includes:
a second connection inclined surface portion that connects an axial end edge on a side axially far from the processing target portion in the axial end edge of the supported surface portion and the outer peripheral edge of the axial side surface, and is inclined radially outward as approaching the processing target portion in the axial direction, or
a second step portion that has a cylindrical surface portion bent from at least the outer peripheral edge of the axial side surface in a direction approaching the processing target portion in the axial direction.

6. The shaft member according to claim 1, wherein
the chamfered portion includes a pair of the supported surface portions, and the pair of supported surface portions are connected to each other by a third step portion including a circular ring-shaped flat surface portion and a cylindrical surface portion.

7. The shaft member according to claim 1, wherein
the axial side surface is an axial end surface.

8. The shaft member according to claim 1, wherein
a stepped cylindrical portion, in which a small-diameter cylindrical portion and a large-diameter cylindrical portion are connected to each other by a step surface facing the axial direction, is provided at a portion on the outer peripheral surface that is deviated from the processing target portion in the axial direction, and
the axial side surface is the step surface.

9. The shaft member according to claim 8, wherein
a recessed groove recessed radially inward is provided in an end portion of the small-diameter cylindrical portion that is on a side close to the large-diameter cylindrical portion in the axial direction.

10. The shaft member according to claim 1, wherein the shaft member is configured to be used as a screw shaft for a brake actuator.

11. A method for manufacturing a male shaft including an outer peripheral surface, and a male-side engagement portion formed on at least a part of the outer peripheral surface, the method comprising:
a step of performing processing for forming the male-side engagement portion on the outer peripheral surface in a state where the shaft member according to claim 1 is positioned in a radial direction by pressing at least an axially intermediate portion of the supported surface portion of the shaft member against a tapered surface provided on a jig.

12. A method for manufacturing a male shaft including an outer peripheral surface, and a male-side engagement portion formed on at least a part of the outer peripheral surface, the method comprising:
a step of performing processing for forming the male-side engagement portion on the outer peripheral surface in a state where at least an axially intermediate portion of the supported surface portion of the shaft member according to claim 10 is pressed against a tapered surface provided on a jig and grease is held in the recessed groove.

13. The method for manufacturing a male shaft according to claim 11, wherein
the processing for forming the male-side engagement portion is rolling processing.

14. The method for manufacturing a male shaft according to claim 11, wherein
the male-side engagement portion is a male screw portion in which a male screw groove is spirally formed.

15. The method for manufacturing a male shaft according to claim 11, further comprising:
a heat treatment step of performing a heat treatment on the male shaft, wherein
the male shaft is not further processed after the heat treatment step.

16. The shaft member according to claim 1, wherein
a pair of the chamfered portions are formed at the connection portion between the axial ends of the outer peripheral surface and the outer peripheral edge of both axial sides of the shaft member;
the length of the supported surface portion of one of the pair of the chamfered portions is longer than the length of the supported surface portion of the other of the pair of the chamfered portions.

17. The shaft member according to claim 16, wherein
the one of the pair of the chamfered portions includes:
a first connecting inclined surface portion connecting axial end edges of both axial ends of the supported surface portion that are close to the processing target portion with respect to the axial direction and the axial end edge of the outer peripheral surface, and inclined in a direction that moves outward in the radial direction as it approaches the processing target portion in the axial direction; and
a second connection inclined surface portion connects the axial end edges of both ends of the supported surface portion that are farther from the processing target portion in the axial direction to the outer peripheral edge of the axial side, and is inclined in a direction that moves outward in the radial direction as it approaches the processing target portion in the axial direction;
and
in the one of the pair of the chamfered portions, an axial dimension of the first connection inclined surface portion is equal to the axial dimension of the second connection inclined surface portion.

18. The shaft member according to claim 16, wherein
the other of the pair of the chamfered portions includes:
a first connecting inclined surface portion connecting axial end edges of both axial ends of the supported surface portion that are close to the processing target portion with respect to the axial direction and the axial end edge of the outer peripheral surface, and inclined in a direction that moves outward in the radial direction as approaching the processing target portion in the axial direction; and
a second connection inclined surface connects the axial end edges of both ends of the support surface that are farther from the processing target portion in the axial direction and the outer peripheral edge of the axial side, and is inclined in a direction that moves outward in the radial direction as approaching the processing target portion in the axial direction, and in the other of the pair of the chamfered portions, an axial dimension of the first connection inclined surface portion is larger than the axial dimension of the second connection inclined surface portion.

* * * * *